(12) United States Patent  
Ota et al.

(10) Patent No.: US 8,499,145 B2
(45) Date of Patent: Jul. 30, 2013

(54) APPARATUS, SYSTEM, AND METHOD OF SETTING A DEVICE

(75) Inventors: Hiroshi Ota, Tokyo (JP); Akira Yokoyama, Kawasaki (JP); Atsushi Okazato, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 284 days.

(21) Appl. No.: 12/720,299

(22) Filed: Mar. 9, 2010

(65) Prior Publication Data

US 2010/0235642 A1 Sep. 16, 2010

(30) Foreign Application Priority Data

Mar. 10, 2009 (JP) ................................. 2009-56419
Sep. 14, 2009 (JP) ............................... 2009-212154
Jan. 25, 2010 (JP) ............................... 2010-013286

(51) Int. Cl.
    *G06F 21/00* (2006.01)
(52) U.S. Cl.
    USPC ................. 713/153; 726/3; 726/10; 713/152; 713/175; 709/223; 709/229; 380/30; 455/411
(58) Field of Classification Search
    USPC ................................................. 713/153, 175
    See application file for complete search history.

(56) References Cited

U.S. PATENT DOCUMENTS

| | | | | |
|---|---|---|---|---|
| 5,940,509 A * | 8/1999 | Jovanovich et al. | ........... | 713/191 |
| 6,718,390 B1 * | 4/2004 | Still et al. | ....................... | 709/229 |
| 7,512,974 B2 * | 3/2009 | Callaghan et al. | .............. | 726/14 |
| 7,640,427 B2 * | 12/2009 | Callas et al. | .................. | 713/153 |
| 7,849,306 B2 * | 12/2010 | Takeshima et al. | ........... | 713/153 |
| 2006/0020699 A1 * | 1/2006 | D'Esposito | .................... | 709/224 |
| 2006/0020782 A1 * | 1/2006 | Kakii | ............................ | 713/156 |
| 2006/0075219 A1 * | 4/2006 | Callaghan et al. | ............ | 713/156 |
| 2006/0117100 A1 * | 6/2006 | Ogawa et al. | ................. | 709/223 |
| 2006/0129669 A1 * | 6/2006 | Kojima | ......................... | 709/223 |
| 2006/0161662 A1 * | 7/2006 | Ng et al. | ....................... | 709/227 |
| 2006/0242272 A1 * | 10/2006 | Furukawa | ..................... | 709/220 |
| 2007/0005981 A1 * | 1/2007 | Miyazawa | ..................... | 713/176 |
| 2007/0150946 A1 * | 6/2007 | Hanberger et al. | ............. | 726/15 |
| 2007/0271257 A1 * | 11/2007 | Kari et al. | ......................... | 707/5 |
| 2008/0052766 A1 * | 2/2008 | Esperet et al. | ..................... | 726/3 |
| 2008/0104687 A1 * | 5/2008 | Fujiwara et al. | ................ | 726/10 |
| 2008/0134314 A1 * | 6/2008 | Hamid | ............................. | 726/11 |
| 2009/0064038 A1 * | 3/2009 | Fleischman et al. | ......... | 715/810 |

FOREIGN PATENT DOCUMENTS

| | | |
|---|---|---|
| CN | 1371059 A | 9/2002 |
| CN | 1756193 A | 4/2006 |
| CN | 1777116 A | 5/2006 |

(Continued)

OTHER PUBLICATIONS

Chinese Office Action issued Sep. 5, 2012 in Patent Application No. 201010132476.2.
Chinese Office Action mailed Apr. 3, 2013, in Chinese Patent Application No. 201010132476.2.

*Primary Examiner* — Morshed Mehedi
(74) *Attorney, Agent, or Firm* — Oblon, Spivak, McClelland, Maier & Neustadt, L.L.P.

(57) ABSTRACT

A device setting apparatus performs setting operation with respect to a counterpart apparatus using secure communication even when the counterpart apparatus is not previously provided with information required for secure communication. The device setting apparatus detects an error when the error occurs during the setting operation, and executes a browser to request a user to correct the error during the setting operation.

17 Claims, 22 Drawing Sheets

FOREIGN PATENT DOCUMENTS

| | | |
|---|---|---|
| CN | 1901447 A | 1/2007 |
| JP | 2002-7095 | 1/2002 |
| JP | 2005-130455 | 5/2005 |
| JP | 2006-195750 | 7/2006 |
| JP | 2007-181139 | 7/2007 |
| JP | 2007-213226 | 8/2007 |
| JP | 4025268 | 10/2007 |
| JP | 2008-310424 | 12/2008 |

* cited by examiner

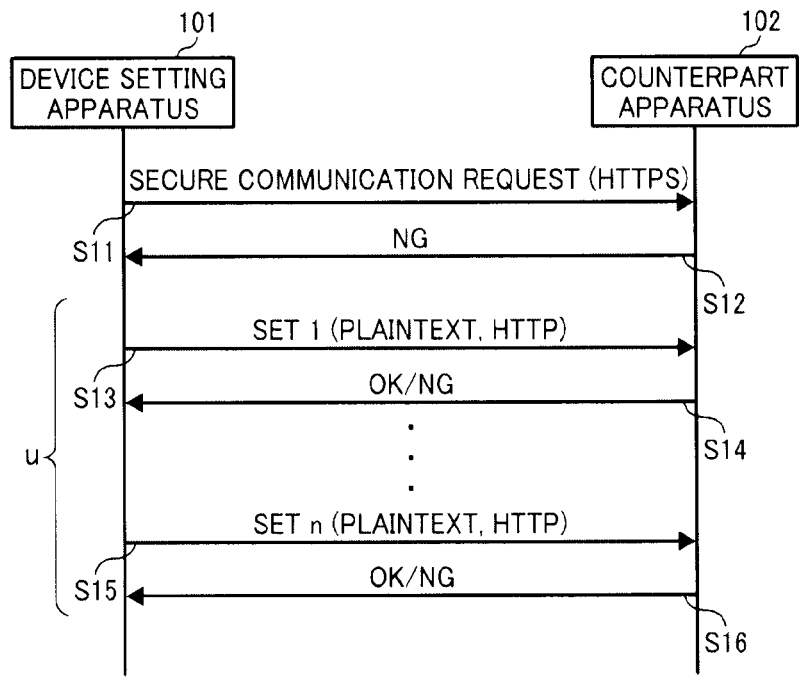
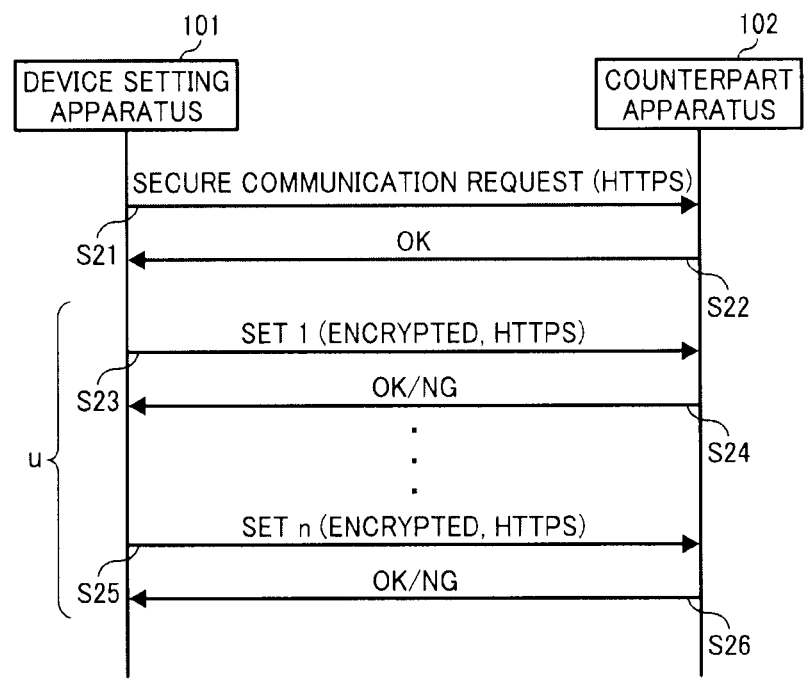

FIG. 7

| No | hostname | User name | Password |
|---|---|---|---|
| 1 | mfp1.example.com | admin | 1234 |
| 2 | mfp2.example.com | admin | 2345 |
| 3 | mfp3.ccc..example.com | admin | 2345 |
| 4 | | | |
| 5 | | | |
| 6 | | | |
| 7 | | | |
| 8 | | | |

| No | procedure | https required |
|---|---|---|
| 1 | admin password setting | TRUE |
| 2 | paper setting | FALSE |
| 3 | | |
| 4 | | |
| 5 | | |
| 6 | | |
| 7 | | |
| 8 | | |

| Host name | CN | O | OU | C |
|---|---|---|---|---|
| mfp1.example.com | mfp1.example.com | example | hq | us |
| mfp2.example.com | mfp2.example.com | example | hq | us |
| mfp3.ccc..example.com | mfp3.ccc..example.com | example | ccc | jp |
| | | | | |
| | | | | |
| | | | | |
| | | | | |
| | | | | |

| No | path | method | https required | param1 | param2 |
|---|---|---|---|---|---|
| 1 | getTop.cgi | GET | FALSE | | |
| 2 | getLogin.cgi | GET | FALSE | | |
| 3 | doLogin.cgi | POST | FALSE | username=user | password=pass |
| 4 | getTop.cgi | GET | FALSE | | |
| 5 | configList.cgi | GET | FALSE | | |
| 6 | setAdminPassword.cgi | POST | TRUE | | |

| No | path | method | https required | param1 | param2 |
|---|---|---|---|---|---|
| 1 | getTop.cgi | GET | FALSE | | |
| 2 | getLogin.cgi | GET | FALSE | | |
| 3 | doLogin.cgi | POST | FALSE | username=user | password=pass |
| 4 | getTop.cgi | GET | FALSE | | |
| 5 | configList.cgi | GET | FALSE | | |
| 6 | setPaperConfig.cgi | POST | FALSE | | |

| No | path | method | https required | param1 | param2 |
|---|---|---|---|---|---|
| 1 | getTop.cgi | GET | FALSE | | |
| 2 | getLogin.cgi | GET | FALSE | | |
| 3 | doLogin.cgi | POST | FALSE | username=user | password=pass |
| 4 | getTop.cgi | GET | FALSE | | |
| 5 | configList.cgi | GET | FALSE | | |
| 6 | machinCert.cgi | GET | FALSE | | |
| 7 | createCert.cgi | POST | FALSE | operation=create | target=1 |

FIG. 16

| No | path | method | https required | param1 | param2 |
|---|---|---|---|---|---|
| 1 | getTop.cgi | GET | FALSE | | |
| 2 | getLogin.cgi | GET | FALSE | | |
| 3 | doLogin.cgi | POST | FALSE | username=user | password=pass |
| 4 | getTop.cgi | GET | FALSE | | |
| 5 | configList.cgi | GET | FALSE | | |
| 6 | machinCert.cgi | GET | FALSE | | |
| 7 | createCert.cgi | POST | FALSE | operation=csr | target=1 |
| | | | | | |

FIG. 17

| No | path | method | https required | param1 | param2 |
|---|---|---|---|---|---|
| 1 | getTop.cgi | GET | FALSE | | |
| 2 | getLogin.cgi | GET | FALSE | | |
| 3 | doLogin.cgi | POST | FALSE | username=user | password=pass |
| 4 | getTop.cgi | GET | FALSE | | |
| 5 | configList.cgi | GET | FALSE | | |
| 6 | machinCert.cgi | GET | FALSE | | |
| 7 | createCert.cgi | POST | FALSE | operation=install | target=1 |
| | | | | | |

FIG. 23

| No | path | method | param1 | param2 | param3 | expecting result | priority | condition |
|---|---|---|---|---|---|---|---|---|
| 1 | getTop.cgi | GET | | | | | | |
| 2 | getLogin.cgi | GET | | | | | | |
| 3 | doLogin.cgi | POST | username=user | password=pass | | | 3 | |
| 4 | getTop.cgi | GET | | | | | | |
| 5 | configList.cgi | GET | | | | | | |
| 6 | machinCert.cgi | GET | | | | | | |
| 7 | createCert.cgi | POST | operation=create | target=1 | | | 2 | Login |
| 8 | createCert.cgi | POST | operation=create | target=1 | cn=hostname | | 1 | Login¶mError |
| 9 | [sleep 30sec] | | | | | | | |
| 10 | machinCert.cgi | GET | | | | CERTIFICATE 1: INSTALLED | | |

FIG. 24

| No | hostname |
|---|---|
| 1 | 192.168.10.20 |
| 2 | mfp1.example.com |
| 3 | mfp2.example.com |
| 4 | 172.21.10.10 |
| 5 | 172.21.10.11 |
| 6 | 172.21.10.12 |
| 7 | 172.21.10.13 |
| 8 | 172.21.10.14 |

APPARATUS, SYSTEM, AND METHOD OF SETTING A DEVICE

CROSS-REFERENCE TO RELATED APPLICATIONS

This patent application is based on and claims priority under 35 U.S.C. §119 to Japanese Patent Application Nos. 2009-56419 filed on Mar. 10, 2009, 2009-212154 filed on Sep. 14, 2009, and 2010-013286 filed on Jan. 25, 2010, in the Japanese Patent Office, the disclosure of which is hereby incorporated herein by reference.

FIELD OF THE INVENTION

The present invention generally relates to an apparatus, system, and method of setting a device through a network, and more specifically to an apparatus, system, and method of setting a device through a network using secure communication even when the device is not previously provided with information required for secure communication.

BACKGROUND

Various settings information of a device may be input, updated, viewed or used remotely by a device setting apparatus through a network. For example, as described in the Japanese Patent Application Publication No. 2002-7095, the device setting apparatus may display a web page provided by the device subjected for setting operation on its display to allow the user to set various settings information for the device subjected for setting operation.

In order to prevent settings information from being taken or altered by an unauthorized third party as it is transferred through the open network, it is recommended to use a technique that establishes secure communication between the device setting apparatus and the device subjected for setting operation.

For example, as illustrated in FIGS. 1A and 1B, a device setting apparatus 101 may send a secure communication request to an apparatus ("the counterpart apparatus") 102 subjected for setting operation. FIG. 1A illustrates an example case in which the device setting apparatus 101 and the counterpart apparatus 102 communicate in plaintext using the HTTP to perform a user request ("u"). FIG. 1B illustrates an example case in which the device setting apparatus 101 and the counterpart apparatus 102 communicate in encrypted form using the HTTPS to perform a user request ("u").

Referring to FIG. 1A, at S11, the device setting apparatus 101 sends a secure communication request to the counterpart apparatus 102 using the HTTP protocol with the Secure Sockets Layer (SSL), or the HTTPS. At S12, the counterpart apparatus 102 returns the "NG" response indicating that the secure communication is not available. The device setting apparatus 100 sends the user request for setting a plurality of parameter values to the counterpart apparatus 102 in plaintext using the HTTP, for example, at S13 and S15. The counterpart apparatus 102 returns the response in response to the user request in plaintext using the HTTP, for example, at S14 and S16. In this case of FIG. 1A, various information communicated through the network may be leaked to the third party. For example, if the administrator's password is sent through the network, such information may be stolen.

Referring to FIG. 1B, at S21, the device setting apparatus 101 sends a secure communication request to the counterpart apparatus 102 using the HTTPS. At S22, the counterpart apparatus 102 returns the "OK" response indicating that the secure communication is available. The device setting apparatus 100 sends the user request for setting a plurality of parameter values to the counterpart apparatus 102 in encrypted form using the HTTPS, for example, at S23 and S25. The counterpart apparatus 102 returns the response in response to the user request in encrypted form using the HTTPS, for example, at S24 and S26. In this case of FIG. 1B, information exchanged between the device setting apparatus 101 and the counterpart apparatus 102 is protected from the third party.

While the use of secure communication such as the use of SSL protocol protects the information from being taken or altered, the secure communication of FIG. 1B can be performed only when the counterpart apparatus 102 is previously installed with information required to perform the secure communication such as a certificate in the case of SSL. More specifically, in order to cause the counterpart apparatus 102 of FIG. 1A to be able to communicate via SSL, an administrator is required to manually install a certificate onto the counterpart apparatus 102. This was cumbersome especially when there is a need for setting a large number of counterpart apparatuses 102. Further, a type of certificate may differ among the devices such that manually installing a certificate specific to each device has been cumbersome.

SUMMARY

In view of the above, example embodiments of the present invention include a device setting apparatus capable of performing setting operation with respect to a counterpart apparatus using secure communication even when the counterpart apparatus is not previously provided with information required for secure communication.

For example, the device setting apparatus may determine whether the counterpart apparatus is capable of performing secure communication to generate a determination result. According to the determination result indicating that the counterpart apparatus is not capable of performing secure communication, the device setting apparatus executes operation of setting secure communication for the counterpart apparatus. The device setting apparatus sends a request for performing a user request to the counterpart apparatus using a secure communication interface protocol.

Further, example embodiments of the present invention include a device setting apparatus capable of detecting an error when the error occurs during the setting operation, and executing a browser to request a user to correct the error during the setting operation.

In addition to the above-described example embodiments, the present invention may be practiced in various other ways, for example, as a method of setting a device, a device setting system, a computer-readable program that causes a computer to perform the above-described operation, or a recording medium storing the plurality of instructions that causes a computer to perform the above-described operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a data flow diagram illustrating operation of setting a counterpart apparatus through a device setting apparatus using a background technique;

FIG. 1B is a data flow diagram illustrating operation of setting a counterpart apparatus through a device setting apparatus using the background technique;

FIG. 7 is an example table storing information regarding a counterpart apparatus;

FIG. 8 is an example table storing procedure information regarding one or more procedures to be performed to complete setting of a counterpart apparatus;

FIG. 9 is an example table storing certificate information used for creating a certificate to be installed to a counterpart apparatus;

FIG. 10 is an example table storing procedure list information indicating a procedure of setting an administrator password;

FIG. 11 is an example table storing procedure list information indicating a procedure of setting paper information;

FIG. 12 is an example table storing procedure list information indicating a procedure of creating a certificate;

FIG. 16 is an example table storing procedure list information indicating a procedure of creating a certificate with a request to sign;

FIG. 17 is an example table storing procedure list information indicating a procedure of installing a signed certificate;

FIG. 23 is an example table storing procedure list information indicating a procedure of creating and installing a certificate;

FIG. 24 is an example table storing information regarding a counterpart apparatus;

Figure 2:
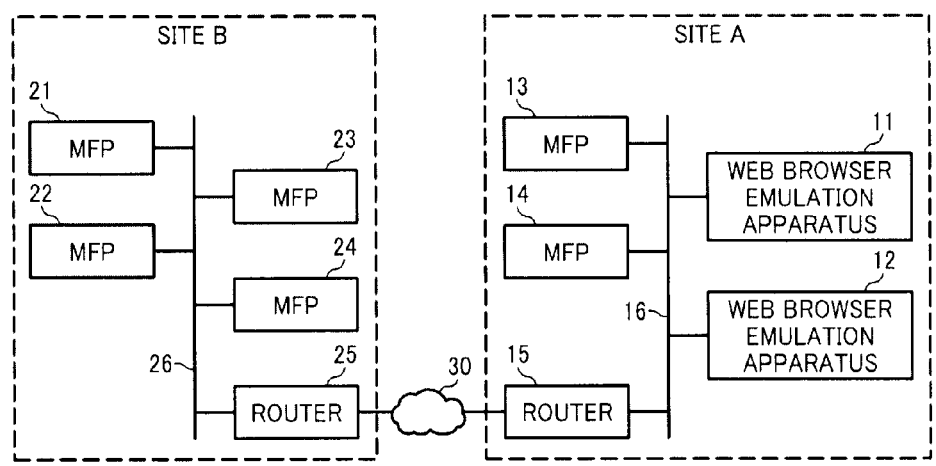
FIG. 2 is a schematic block diagram illustrating a configuration of a device setting system including a device setting apparatus and a counterpart apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Configuration of a Device Setting System>

Referring now to FIG. 2, a configuration of a device setting system is explained according to an example embodiment of the present invention. The device setting system of FIG. 2 includes a plurality of sites such as a site A and site B, which are located at different locations.

The site A includes two web browser emulation apparatus 11 and 12, two multifunctional apparatus (MFP) 13 and 14, and a router 15, which are connected through a bus 16. The router 15 is connected to a network 30, which is implemented by a virtual private network (VPN). The site B includes four MFPs 21, 22, 23, and 24, and a router 25, which are connected through a bus 26. The router 25 is connected to the network 30.

In this example, two web browser emulation apparatus 11 and 12 are provided at the site A. Alternatively, any desired number of web browser emulation apparatus may be provided at any site. For example, one web browser emulation apparatus may be provided for each of site A and site B. The web browser emulation apparatus 11 and 12 may be operated in cooperation, or may be operated alone.

In this example, the web browser emulation apparatus 11 and 12 each function as a device setting apparatus 1 capable of setting a counterpart apparatus subjected for setting operation through the network 30 using a web interface provided by the counterpart apparatus. More specifically, the web browser emulation apparatus 11 and 12 may each be provided with a web browser that sends a request to a web server provided in the counterpart apparatus for a specific resource to complete setting operation with respect to the counterpart apparatus.

In this example, the counterpart apparatus is any one of the MFPs 13, 14, 21, 22, 23, and 24. The MFP is an image forming apparatus capable of providing a plurality of functions including the function of copying, printing, scanning, facsimile communication, and data transmission or reception, etc., in addition to the function of providing the web interface to the web browser emulation apparatus 11 or 12 using the web server. For the descriptive purpose, the web browser emulation apparatus 11 and 12 may be each or collectively referred to as the device setting apparatus 1, and the MFPs 13, 14, 21, 22, 23, and 24 may be each or collectively referred to as the counterpart apparatus 20.

Further, in this example, any number of sites or any number of counterpart apparatus 20 may be provided under management of the device setting apparatus 1. Practically, some thousands of the MFPs are most likely provided on the network 30 to be managed by the device setting apparatus 1. Further, the counterpart apparatus 20 subjected for setting operation is not limited to the MFP. Alternatively, the counterpart apparatus 20 may be implemented by any desired apparatus such as a portable phone, digital camera, personal digital assistance (PDA) device, facsimile apparatus, scanner, copier, printer, etc., as long as the counterpart apparatus 20 is provided with a communication device for allowing communication with the device setting apparatus 1 through the network 30 and a web server function for providing the web interface to the device setting apparatus 1. The network 30 may be the network of any desired type including the wired or wireless network, the Internet, etc.

<Hardware Structure of a Device Setting Apparatus>

Figure 3:
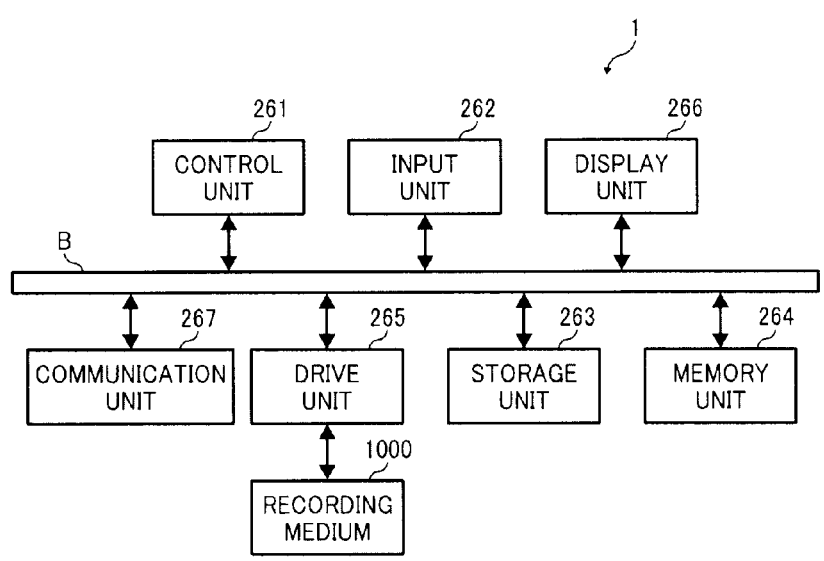
FIG. 3 is a schematic block diagram illustrating a hardware structure of the device setting apparatus of FIG. 2.

Referring to FIG. 3, a hardware structure of the device setting apparatus 1 is explained according to an example embodiment of the present invention. The device setting apparatus 1 includes a control unit 261, an input unit 262, a storage unit 263, a memory unit 264, a drive unit 265, a display unit 266, and a communication unit 267, which are connected through a bus B.

The control unit 261 may be implemented by a central processing unit (CPU) capable of controlling entire operation of the device setting apparatus 1. The memory unit 26 may be implemented by a read only memory (ROM) and/or a random access memory (RAM). The storage unit 263 may be implemented by a hard disk drive (HDD) capable of storing data therein. The input unit 262 allows a user at the device setting apparatus 1 to input a user instruction such as a user request that requests the device setting apparatus 1 to set the counterpart apparatus 20, and may be implemented by a keyboard, mouse, etc. The display unit 266 may be implemented by a liquid crystal display (LCD) capable of displaying information to the user. The drive unit 265 reads or writes data from or onto a recording medium 1000. The examples of the recording medium 1000 include, but not limited to, optical discs such as CD-ROM, DVD-ROM, magneto-optical discs, and SD card. The communication unit 267 allows the device setting apparatus 1 to communicate with the other apparatus such as the counterpart apparatus 20 through the network 30, and may be implemented by a network interface card (NIC).

In operation, any one of the storage unit 263, the memory unit 264, and the recording medium 1000 may be provided with a device setting control program. Upon execution, the control unit 261 loads the device setting control program onto the RAM of the memory unit 264 to have the functional blocks illustrated in any one of FIG. 4 and FIG. 20. Alternatively, the control unit 261 may download the device setting control program onto any one of its local memory from the network 30.

The counterpart apparatus 20, such as the MFP, may have a hardware structure that is substantially similar to the structure illustrated in FIG. 3. The differences include the addition of an image forming device for allowing the MFP to perform image forming function such as an image forming engine.

<Functional Structure of a Device Setting Apparatus>

Figure 4:
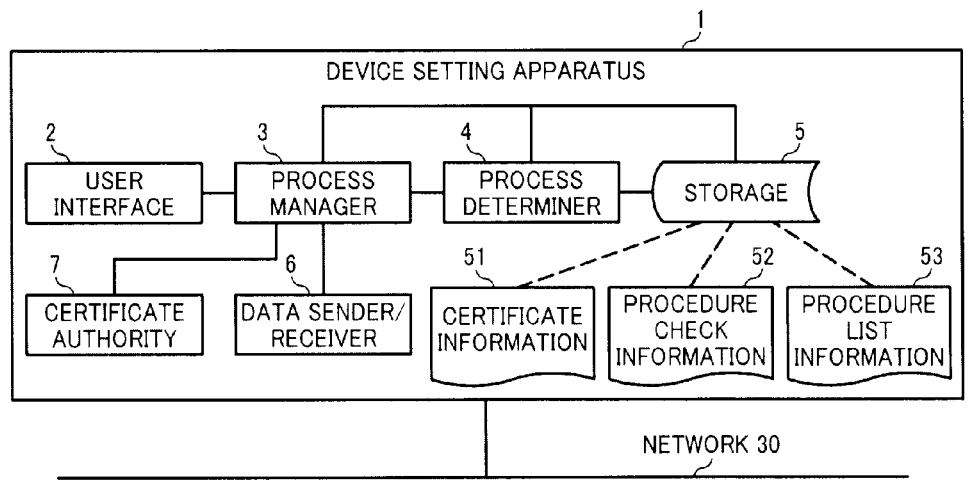
FIG. 4 is a schematic block diagram illustrating a functional structure of the device setting apparatus of FIG. 3, according to an example embodiment of the present invention.

Referring to FIG. 4, a functional structure of the device setting apparatus 1 is explained according to an example embodiment of the present invention. In this example, the device setting apparatus 1 performs setting operation with respect to the counterpart apparatus 20 through the network 30 according to a user instruction received from the user. The device setting apparatus 1 includes a user interface 2, a process manager 3, a process determiner 4, a storage 5, a data sender/receiver 6, and a certificate authority 7.

The user interface 2 sends information input by the user to the process manager 3, or sends information regarding the process result obtained by the process manager 3 to the user, using the input unit 262 or the display unit 266 (FIG. 3).

The process manger 3 manages setting operation performed by the device setting apparatus 1, for example, by controlling one or more devices of the device setting apparatus 1. For example, the process manager 3 controls one or more processes in setting operation according to information stored in the storage 5.

The process determiner 4 determines one or more procedure to be performed by the device setting apparatus 1. For example, the process determinator 4 determines whether sending a request to the counterpart apparatus 20 or receiving a response from the counterpart apparatus 20 is needed, for example, based on information stored in the storage 5 or the response received through the data sender/receiver 6, to generate a determination result. The determination result may be stored in the storage 5 at least temporarily. The process manager 3 and the process determiner 4 may be implemented by the control unit 261 (FIG. 3).

The data sender/receiver 6 controls communication with the counterpart apparatus 20 through the network 30, for example, by sending the request or receiving the response through the web interface. For example, the data sender/receiver 6 may send a request for performing a specific process to the counterpart apparatus 20, and receive a response including the process result of performing the specific process from the counterpart apparatus 20. The data sender/receiver 6 may store information regarding the process result in the storage 5 as log information. The data sender/receiver 6 may be implemented by the communication unit 267 (FIG. 3).

The storage 5 stores various information such as certificate information 51, procedure check information 52, and procedure list information 53, and may be implemented by any desired local memory of FIG. 3. The certification information 51 specifies one or more items to be used to generate a certificate for the specific counterpart apparatus 20, which is required for secure communication including communication using a secure interface protocol such as SSL. The procedure check information 52 specifies one or more procedures to be performed by the device setting apparatus 1 to complete setting of the counterpart apparatus 20. The procedure list information 53 specifies one or more processes to complete a specific procedure included in the procedure check information 52 as well as information regarding the specific procedure. The storage 5 may further store counterpart apparatus information regarding the counterpart apparatus 20.

The certificate authority 7 signs a certificate in response to a request for signing the certificate, which may be sent from the counterpart apparatus 20.

In this example, the above-described devices are all incorporated in the device setting apparatus 1. Alternatively, any one of the above-described devices may be separately provided in one or more apparatuses or may be distributed throughout the network 30. For example, the storage 5 may be implemented by a storage device provided on the network 30 to allow any other apparatus on the network 30 to access information stored in the storage 5. In another example, the certificate authority 7 may be provided outside the device setting apparatus 1.

<Operation of Setting the Counterpart Apparatus>

Figure 5:
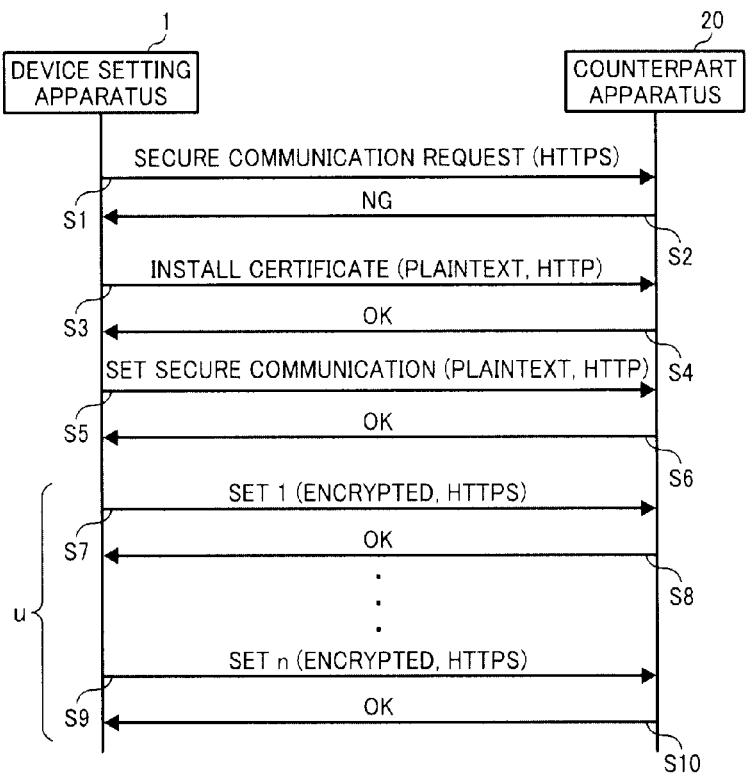
FIG. 5 is a data flow diagram illustrating operation of setting a counterpart apparatus through the device setting apparatus of FIG. 4, according to an example embodiment of the present invention.

FIG. 5 illustrates a data flow diagram illustrating operation of setting the counterpart apparatus 20, performed by the device setting apparatus 1, according to an example embodiment of the present invention. For example, the operation of FIG. 5 may be performed by the web browser emulation apparatus 11 with respect to the MFP 21, when an instruction is received from the user at the device setting apparatus 1. The user at the device setting apparatus 1 may be an authorized user such as a system administrator.

At S1, the device setting apparatus 1 sends a secure communication request to the counterpart apparatus 20 using the HTTPS protocol to request the counterpart apparatus 20 to start secure communication. In this example, it is assumed that the secure communication request requests communication via the secure interface protocol such as SSL. Assuming that the counterpart apparatus 20 is not capable of communicating in a secure manner, at S2, the counterpart apparatus 20 returns the "NG" response indicating that secure communication is not available.

At S3, the device setting apparatus 1 sends a certificate install request to the counterpart apparatus 20 in plaintext using the HTTP to request the counterpart apparatus 20 to create and install a certificate required for SSL. At this time, the device setting apparatus 1 may cause the counterpart apparatus 20 to create a certificate specific to the counterpart apparatus 20 by sending information required for creating the certificate. For example, the device setting apparatus 1 may send information obtained from the certification information 51 stored in the storage 5, according to a certificate creation procedure specified by the procedure list information 53 stored in the storage 5. The information required for creating the certificate may include, for example, information to be used by the counterpart apparatus 20 to generate a private key that is required for signing the certificate, information regarding a public key used for encryption, etc.

At S4, after the counterpart apparatus 20 installs the certificate, the counterpart apparatus 20 sends the "OK" response to the device setting apparatus 1 indicating that the certificate has been successfully installed. With the "OK" response, the device setting apparatus 1 recognizes that the certificate required for secure communication is installed.

At S5, the device setting apparatus 1 sends a secure communication setting request to the counterpart apparatus 20 in plaintext using the HTTP to request the counterpart apparatus 20 to set with settings information required for secure communication ("secure communication settings information").

In this example, in order to require the counterpart apparatus 20 to communicate via the secure interface protocol such as SSL, the device setting apparatus 1 sends a request for setting the value of SSL setting to be valid.

At S6, the counterpart apparatus 20 completes setting of secure communication using the secure communication settings information that is received from the device setting apparatus 1, and sends the "OK" response to the device setting apparatus 1. With this "OK" response, the device setting apparatus 1 recognizes that setting for secure communication has been successfully completed.

The device setting apparatus 1 sends a user request (indicated by the "u" in FIG. 5) that requests the counterpart apparatus 20 to perform a sequence of procedures 1 to n to complete setting of the counterpart apparatus 20, in encrypted form using the HTTPS, to the counterpart apparatus 20, for example, at S7 and S9.

The counterpart apparatus 20 returns the response in response to the user request in encrypted form using the HTTPS, for example, at S8 and S10. For example, when the counterpart apparatus 20 receives the user request for performing the procedure 1 in encrypted form using the HTTPS at S7, the counterpart apparatus 20 decrypts the user request for performing the procedure 1, and performs the procedure 1. After the procedure 1 is completed, the counterpart apparatus 20 sends the "OK" response indicating that the procedure 1 is successfully performed to the device setting apparatus 1 in encrypted form using the HTTPS.

In the above-described example, when the response sent by the counterpart apparatus 20 at S2 in response to the secure communication request sent by the device setting apparatus 1 at S1 is the "OK" response indicating that secure communication is available, the steps S3 to S6 are not performed.

Alternatively, the steps S1 and S2 may not be performed to determine whether the counterpart apparatus 20 is capable of communicating in a secure manner. For example, the device setting apparatus 1 may send the user request in encrypted form using the HTTPS to the counterpart apparatus 20 as described above referring to S7 or S9. When the "NG" response is returned from the counterpart apparatus 20, the device setting apparatus 1 determines that secure communication is not available and performs the steps S3 to S6.

As described above referring to FIG. 5, the device setting apparatus 1 is capable of establishing secure communication with the counterpart apparatus 20 even when the counterpart apparatus 20 is not capable of performing secure communication. Since the device setting apparatus 1 automatically executes the above-described steps S3 to S6 to enable the counterpart apparatus 20 to perform secure communication, the user at the device setting apparatus 1 does not have to manually perform the above-described steps S3 to S6 with respect to the counterpart apparatus 20. Accordingly, operation of setting the counterpart apparatus 20 can be efficiently performed with improved security especially when a large number of counterpart apparatuses needs to be set through the network.

In the above-described example, the setting for the secure communication includes requesting the counterpart apparatus 20 to create and install a certificate by providing information required for creation of the certificate such as information regarding a private key, and requesting the counterpart apparatus 20 to complete setting of secure communication such as setting of the valid value for SSL.

In alternative to requiring the use of SSL as secure communication, the device setting apparatus 1 may request the counterpart apparatus 20 to perform secure communication by any other secure communication means such as by using the IPsec communication.

<Example Operation of Setting the Counterpart Apparatus>

Referring now to FIGS. 6 to 12, operation of setting the counterpart apparatus 20, performed by the device setting apparatus 1, is explained in detail according to an example embodiment of the present invention.

At S101, the user at the device setting apparatus 1 instructs the device setting apparatus 1 to perform an operation of setting the counterpart apparatus 20 through the user interface 2.

At S102, the user interface 2 of the device setting apparatus 1 sends a user instruction for performing the operation of setting the counterpart apparatus 20 to the process manager 3.

At S103, the process manager 3 of the device setting apparatus 1 obtains information regarding the setting operation such as the counterpart apparatus information regarding the apparatus subjected for setting operation, and the procedure check information 52 specifying one or more procedures to be performed, from the storage 5.

The counterpart apparatus information regarding the apparatus subjected for setting operation is stored in the storage 5, for example, in the form of an apparatus list of FIG. 7. The apparatus list of FIG. 7 includes the "No" field storing an arbitrary number assigned to each entry of the counterpart apparatus subjected for setting operation, the "hostname" field storing apparatus identification information for identifying an owner of the specific counterpart apparatus, the "user name" field storing a user name of an administrator for the specific counterpart apparatus, and the "password" field storing a password of the administrator for the specific counterpart apparatus. In this example, the apparatus identification information is expressed in a domain name or an URL address assigned to the counterpart apparatus. Further, the counterpart apparatus information of FIG. 7 indicates that setting operation is to be performed with respect to three counterpart apparatuses 20. However, any number of counterpart apparatuses may be registered.

The storage 5 further stores the procedure check information 52 regarding one or more procedures to be performed by the device setting apparatus 1 to complete setting of each counterpart apparatus 20, for example, in the form of a procedure list of FIG. 8. The procedure list of FIG. 8 includes the "No" field storing an arbitrary number assigned to each entry of the procedure previously determined with respect to the counterpart apparatus 20, the "procedure" field storing procedure identification information for identifying a specific procedure to be performed, and the "https required" field indicating whether secure communication is required for the specific procedure that is entered. The procedure list 52 of FIG. 8 indicates that the procedure of setting an administrator password ("administrator password setting procedure"), and the procedure of setting paper information ("paper setting procedure") are performed. In alternative or addition to the listed procedures, any procedure may be registered. Further, in this example, it is assumed that the "https required" field is not previously entered or provided at the time of receiving a user instruction for starting operation of setting. Alternatively, the "https required" field may be previously entered.

According to the counterpart apparatus information and the procedure check information 52 stored in the storage 5, the process manager 3 determines to instruct the respective counterpart apparatuses 20 listed in the apparatus list to perform one or more procedures listed in the procedure list.

Before starting operation of setting the counterpart apparatus 20, the device setting apparatus 1 performs preparatory operation ("p" in FIG. 6) as described below referring to S104 to S117 of FIG. 6 for each counterpart apparatus 20.

First, the device setting apparatus 1 determines whether the counterpart apparatus 20 is capable of communicating in a secure manner, for example, by sending a secure communication request to the counterpart apparatus 20 to request the counterpart apparatus 20 to communicate using secure communication. For example, the device setting apparatus 1 may send a secure communication request in encrypted form using the HTTPS. Alternatively, the device setting apparatus 1 may send a communication request in plaintext form using the HTTP as long as it is capable of determining whether the counterpart apparatus 20 has been set to communicate using secure communication. When the device setting apparatus 1 determines that the counterpart apparatus 20 is capable of communicating in a secure manner, the device setting apparatus 1 ends the preparatory operation ("p"). When the device setting apparatus 1 determines that the counterpart apparatus 20 is not capable of communicating in a secure manner, the device setting apparatus 1 further performs operation of setting secure communication for the counterpart apparatus 20 to enable the counterpart apparatus 20 to communicate in a secure manner.

Figure 6:
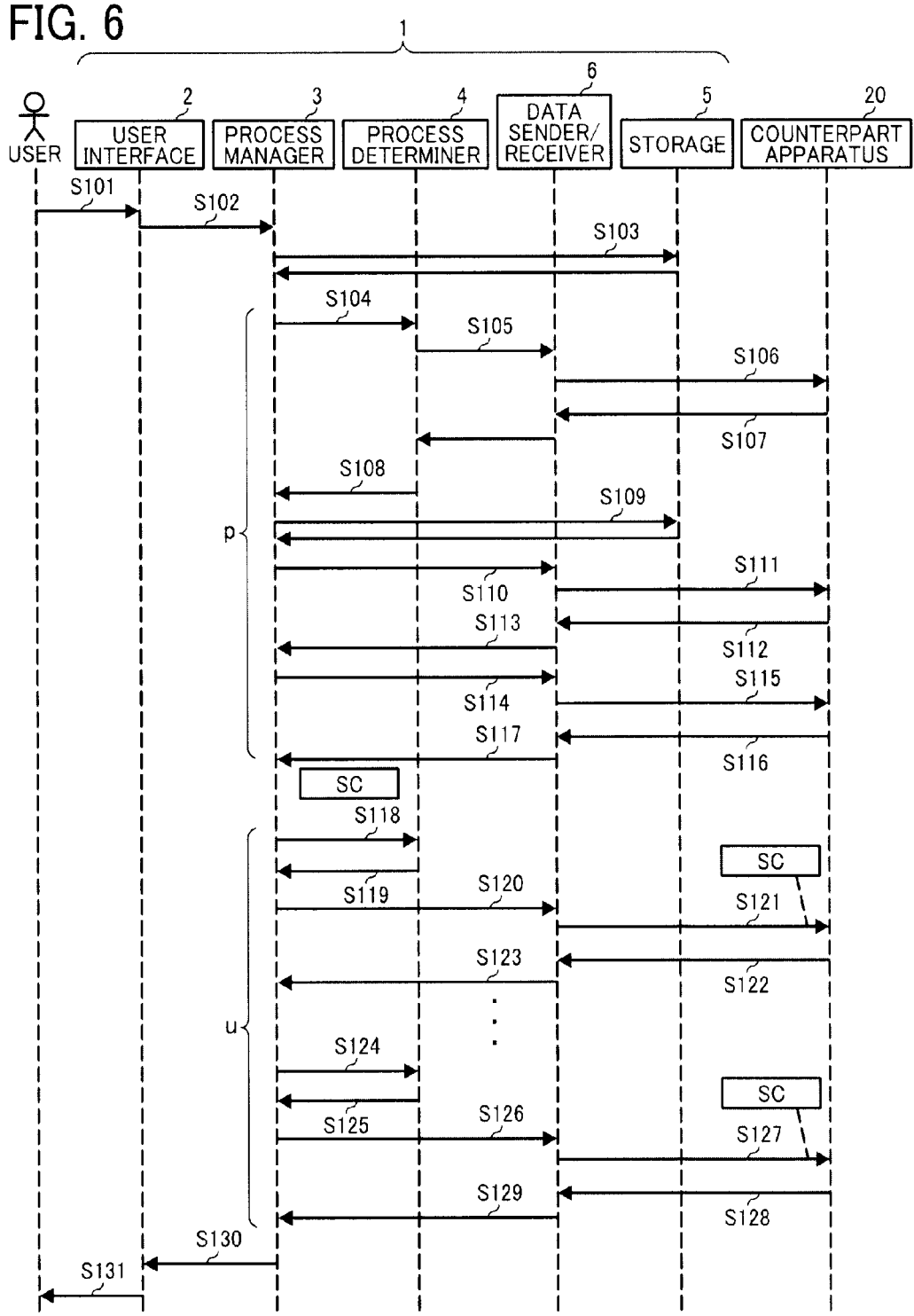
FIG. 6 is a data flow diagram illustrating operation of setting a counterpart apparatus through the device setting apparatus of FIG. 4, according to an example embodiment of the present invention.

More specifically, referring to FIG. 6, at S104, the process manager 3 of the device setting apparatus 1 requests the process determiner 4 to determine whether operation of setting secure communication for the counterpart apparatus 20 is needed. In this example, it is assumed that the secure communication is achieved by communicating via the secure interface protocol such as SSL. In order to communicate via SSL, the operation of setting secure communication includes operation of installing a certificate onto the counterpart apparatus 20 and operation of setting secure communication settings information for the counterpart apparatus 20.

At S105, the process determiner 4 performs the HTTPS test, for example, by causing the data sender/receiver 6 to send a secure communication request to the counterpart apparatus 20. At S106, the data sender/receiver 6 sends a secure communication request to the counterpart apparatus 20 in encrypted form using the HTTPS.

At S107, the data sender/receiver 6 receives a response from the counterpart apparatus 20 in response to the secure communication request, and sends the response to the process determiner 4. Based on the response, the process determiner 4 determines whether the operation of setting secure communication is needed to generate a determination result. At S108, the process determiner 4 sends a determination result to the process manager 3. In this example, it is assumed that the response received from the counterpart apparatus 20 indicates that secure communication, the SSL communication, is not available. Accordingly, the determination result of the process determiner 4 indicates that the operation of setting secure communication is needed.

Based on the determination result indicating that the operation of setting secure communication is needed, at S109, the process manager 3 obtains the certificate information 51 from the storage 5.

In this example, the storage 5 stores the certificate information 51 in the form of a certificate list of FIG. 9. The certificate list of FIG. 9 includes the "Host name" field storing apparatus identification information for identifying the owner of the specific counterpart apparatus, the "CN" field storing common name information for the owner of the specific counterpart apparatus, the "O" field storing organization information for the owner of the specific counterpart apparatus, the "OU" field storing the organization unit information for the owner of the specific counterpart apparatus, and the "C" field storing the country information for the owner of the specific counterpart apparatus. For the descriptive purpose, the owner of the specific counterpart apparatus may be referred to as the entity being certified or the entity. As indicated by the certificate information 51 of FIG. 9, the contents of the certificate differs depending on the specific counterpart apparatus. In addition to or in alternative to the contents stored in the certificate list of FIG. 9, any other type of information may be stored in the storage 5 to be used for creating a certificate. The examples of such information include, but not limited to, information regarding a type of the certificate to be created, information regarding the date and/or time interval for which the certificate is to be valid, information regarding a key such as a public key and a private key, information regarding an encryption algorithm, etc.

Referring back to FIG. 6, at S110, the process manager 3 causes the data sender/receiver 6 to send a certificate install request to the counterpart apparatus 20 to request the counterpart apparatus 20 to create and install a certificate. At S111, the sender/receiver 6 sends a certificate install request in plaintext using the HTTP to the counterpart apparatus 20 to cause the counterpart apparatus 20 to create and install a certificate. At this time, the process manager 3 sends any part of the certification information 51 obtained from the storage 5 to the counterpart apparatus 20 as information required for certificate creation.

Further, at S110 and S111, the device setting apparatus 1 may send any other information obtained from the storage 5 related to creation of the certificate to the counterpart apparatus 20, such as information regarding a private key used for signing the certificate. For example, at S110, the process manager 3 may cause the data sender/receiver 6 to send a key installation request to the counterpart apparatus 20, which requests installation of the private key, while providing information required for generating the private key. At S111, the data sender/receiver 6 sends a key installation request to the counterpart apparatus 20 in plaintext using the HTTP with the information required for generating the private key. Since the private key itself is not exchanged through the network 30, but information required for generating the private key, the private key is protected from the third party.

At S112, the data sender/receiver 6 receives the response from the counterpart apparatus 20 indicating that installation of the certificate is successful. At S113, the data sender/receiver 6 sends the response to the process manager 3.

At S114, the process manager 3 causes the data sender/receiver 6 to send a secure communication setting request to the counterpart apparatus 20 to request the counterpart apparatus 20 to set with secure communication settings information. At S115, the data sender/receiver 6 sends a secure communication setting request to the counterpart apparatus 20 in plaintext using the HTTP with secure communication settings information. More specifically, in this example, the process manager 3 sends a request for changing the value of SSL setting to be valid to the counterpart apparatus 20 through the data sender/receiver 6.

At S116, the data sender/receiver 6 receives the response from the counterpart apparatus 20 indicating that setting of the secure communication settings information is successful. At S117, the data sender/receiver 6 sends the response to the process manager 3.

With the above-described operation of setting secure communication, the counterpart apparatus 20 is now able to communicate with the device setting apparatus 1 in a secure manner as indicated by "SC" in FIG. 6.

The operation proceeds from the above-described preparatory operation ("p") to the operation of performing the user request ("u"). Before performing the user request, the process manager 3 requests the process determiner 4 to determine whether the one or more procedures to be performed require secure communication to generate a determination result. The process determiner 4 accesses the procedure check information 52 stored in the storage 5, and determines whether each procedure listed in the procedure check information 52 requires secure communication to generate a determination result. The determination result may be stored in the storage 5, for example, in the "https required" field of the procedure check information 52 of FIG. 8.

In this example, whether to require secure communication may be determined, for example, based on the procedure list information 53. In the example case of the administrator password setting procedure, the device setting apparatus 1 may be provided with an administrator password setting procedure list of FIG. 10, which lists a sequence of processes required for setting an administrator password for the counterpart apparatus 20. Since the administrator password setting procedure includes a process that requires secure communication, which is the "SetAdminPassword.cgi" entry having the "TRUE" value for the "https required" field, the administrator password setting procedure is determined to require secure communication. Accordingly, the process determiner 4 stores the determination result "TRUE" in the "https required" field of the procedure list of FIG. 8 for the administrator password setting procedure.

In the example case of the paper setting procedure, the device setting apparatus 1 may be provided with a paper setting procedure list of FIG. 11, which lists a sequence of processes required for setting the parameters regarding paper for the counterpart apparatus 20. Since the paper setting procedure does not include any process that requires secure communication, the paper setting procedure is determined not to require secure communication. Accordingly, the process determiner 4 stores the determination result "FALSE" in the "https required" field of the procedure list of FIG. 8 for the paper setting procedure.

More specifically, referring to FIG. 6, at S118, the process manager 3 instructs the process determiner 4 to determine whether the procedure to be performed first requires secure communication. At S119, the process determiner 4 determines that the procedure requires secure communication by referring to the procedure list information 53 or the procedure check information 52 to generate a determination result, and sends the determination result to the process manager 3.

Based on the determination result indicating that secure communication is required, at S120, the process manager 3 instructs the data sender/receiver 6 to send a request for performing the first procedure to the counterpart apparatus 20 in a secure manner. At S121, the data sender/receiver 6 sends a request for performing the first procedure to the counterpart apparatus 20 in encrypted form using the HTTPS.

At S122, the counterpart apparatus 20 sends the OK response indicating that the first procedure is successfully performed. At S123, the data sender/receiver 6 sends the OK response to the process manager 3.

The steps S124 to S129 are sequentially performed in a substantially similar manner as described above referring to S118 to S123 for the following procedure. The steps S118 to S123 are repeated until all procedures listed in the procedure list information 52 are completed.

Upon completion of all procedures, at S130, the process manager 3 sends the process result to the user interface 2. At S131, the user interface 2 displays a screen indicating that the setting operation is successfully performed for display to the user, and the operation ends.

As described above referring to FIG. 6, the device setting apparatus 1 determines whether the counterpart apparatus 20 is able to communicate in a secure manner to generate a determination result. When the determination result indicates that the counterpart apparatus 20 is not capable of communicating in a secure manner, the device setting apparatus 1 automatically executes operation of setting secure communication of the counterpart apparatus 20, for example, by sending information required for performing secure communication to the counterpart apparatus 20. More specifically, in this example, the device setting apparatus 1 executes operation of causing the counterpart apparatus 20 to create and install a certificate, according to the procedure list information 53 and the certificate information 51. Further, the device setting apparatus 1 executes operation of causing the counterpart apparatus 20 to set with secure communication settings information such as the SSL setting by providing the secure communication settings information. In this manner, operation of setting the counterpart apparatus 20 may be performed with improved security without requiring the human intervention.

<Certificate Information and Operation of Creating a Certificate>

As described above referring to S110 and S111 of FIG. 6, the device setting apparatus 1 causes the counterpart apparatus 20 to create and install a certificate specific to the counterpart apparatus 20. More specifically, the device setting apparatus 1 obtains certificate creation procedure information specifying a procedure of creating and installing a certificate for the counterpart apparatus 20 from the procedure list information 53 stored in the storage 5, and executes operation of creating and installing a certificate according to the certificate creation procedure information.

In this example, the certificate creation procedure information is stored in the form of a table illustrated in FIG. 12. The certificate creation procedure information includes the "No" field storing a number specifying the order of performing the processes, the "path" field storing path information of the request, the "method" field storing method information of the request, the "https required" field specifying whether the entered process requires secure communication, the "param 1" field storing a parameter value of the request, and the "param 2" field storing a parameter value for the request. The number of parameters is not limited to two. Further, the certificate creation procedure information may vary depending on the counterpart apparatus 20 subjected for setting operation.

Figure 13:
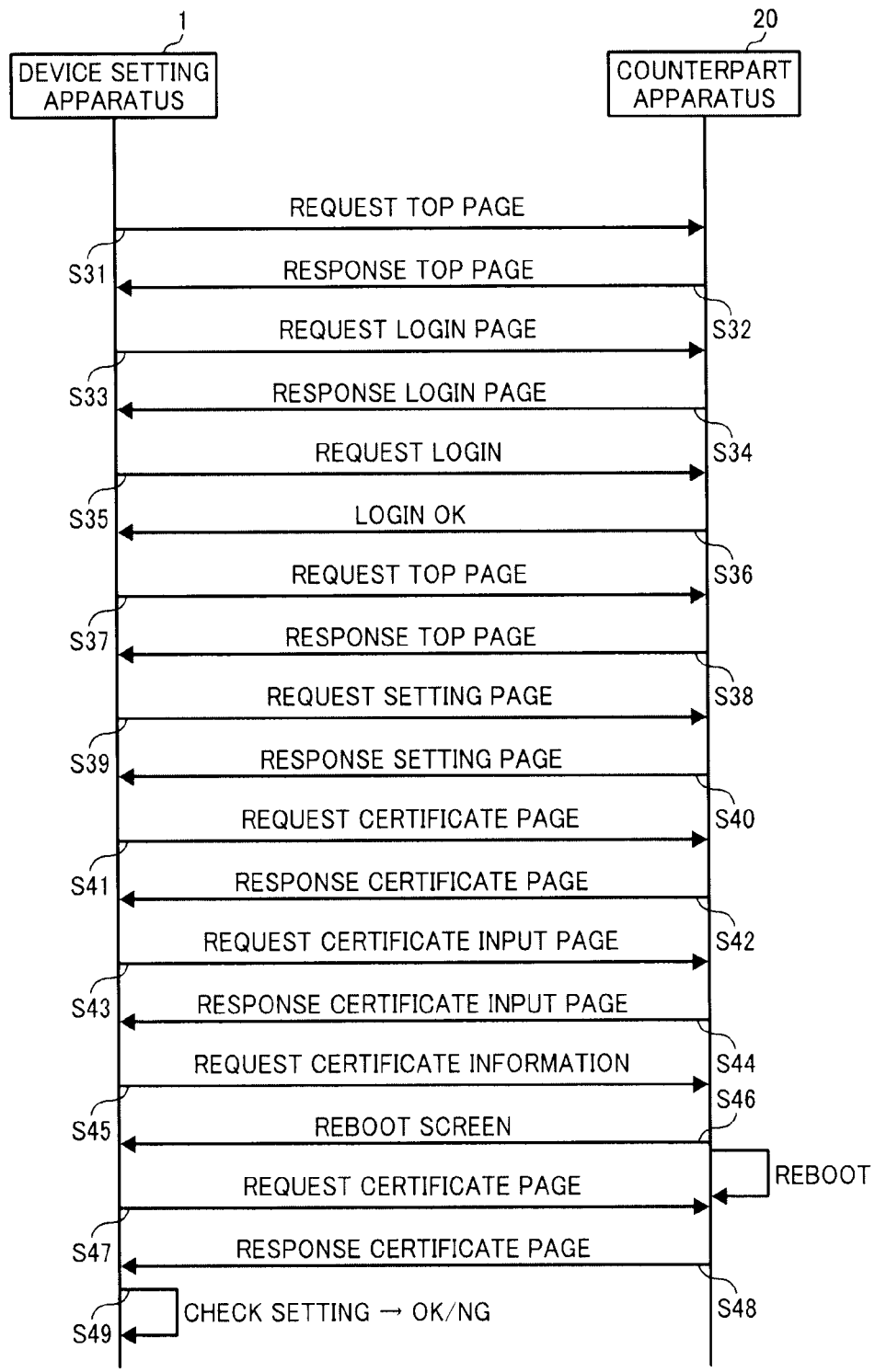
FIG. 13 is a data flow diagram illustrating operation of creating and installing a certificate for a counterpart apparatus through the device setting apparatus of FIG. 4, according to an example embodiment of the present invention.

Referring to the certificate creation procedure information and other information stored in the storage 5, the device setting apparatus 1 executes an operation of creating and installing a certificate, for example, by generating a sequence of requests and causing the requests to be sent to the counterpart apparatus 20. Assuming that the counterpart apparatus 20 subjected for setting operation is the MFP 21 having the hostname of "mfp1.example.com", the device setting apparatus 1 generates a request using the hostname and information stored in the table of FIG. 12, and sends the request to the counterpart apparatus 20 to start operation of creating and installing a certificate, for example, as described below referring to FIG. 13.

At S31, the device setting apparatus 1 sends the request to access a top webpage provided by the counterpart apparatus 20. At S32, the counterpart apparatus 20 receives the request, and sends the response with the top webpage to the device setting apparatus 1.

At S33, the device setting apparatus 1 sends the request to access a login page provided by the counterpart apparatus 20. At S34, the counterpart apparatus 20 sends the response with the login page to the device setting apparatus 1.

At S35, the device setting apparatus 1 sends the request for login to the counterpart apparatus 20 with the user name and the password of the administrator for the counterpart apparatus 20, which may be obtained from the apparatus information stored in the storage 5. Assuming that authentication succeeds, the counterpart apparatus 20 sends the "OK" response at S36.

At S37, the device setting apparatus 1 sends the request to the counterpart apparatus 20 to access the top webpage provided by the counterpart apparatus 20 after logging in as the administrator. At S38, the counterpart apparatus 20 receives the request and sends the response with the top webpage to the device setting apparatus 1.

At S39, the device setting apparatus 1 sends the request to the counterpart apparatus 20 for the setting page that lists a plurality of setting options. At S40, the counterpart apparatus 20 receives the request, and sends the response with the setting page to the device setting apparatus 1.

At S41, the device setting apparatus 1 sends the request to the counterpart apparatus 20 for a certificate page that allows creation of a certificate for the counterpart apparatus 20. At S42, the counterpart apparatus 20 receives the request, and sends the response with the certificate page to the device setting apparatus 1.

At S43, the device setting apparatus 1 sends the request to the counterpart apparatus 20 for a certificate information input page. Referring to FIG. 12, in this example, the device setting apparatus 1 sends the request which causes the counterpart apparatus 20 to create a self-signed certificate with the certificate type of 1. At S44, the counterpart apparatus 20 receives the request, and sends the response with the certificate information input page to the device setting apparatus 100.

At S45, the device setting apparatus 1 sends the request to the counterpart apparatus 20 with information required for creating a certificate, such as information obtained from the certificate information 51 or any other information stored in the storage 5. As described above referring to FIG. 6, such information may include information regarding the entity that creates the certificate obtained from the certificate information 51, information regarding a private or public key, information regarding an encryption algorithm, etc. At S46, the counterpart apparatus 20 sends the response indicating that the counterpart apparatus 20 is rebooting, to the device setting apparatus 1.

While the counterpart apparatus 20 is being rebooted, at S47, the device setting apparatus 1 sends the request to the counterpart apparatus 20 for a certificate page including information regarding the certificate that has been created. At S48, the counterpart apparatus 20 sends the response to the device setting apparatus 1 with the certificate page.

At S49, the device setting apparatus 1 determines whether the certificate is successfully created based on information obtained from the certificate page. At this time, the device setting apparatus 1 may cause the user interface 2 to display a message indicating that the certificate is successfully installed or not.

<Example Operation of Setting the Counterpart Apparatus>

Figure 14:
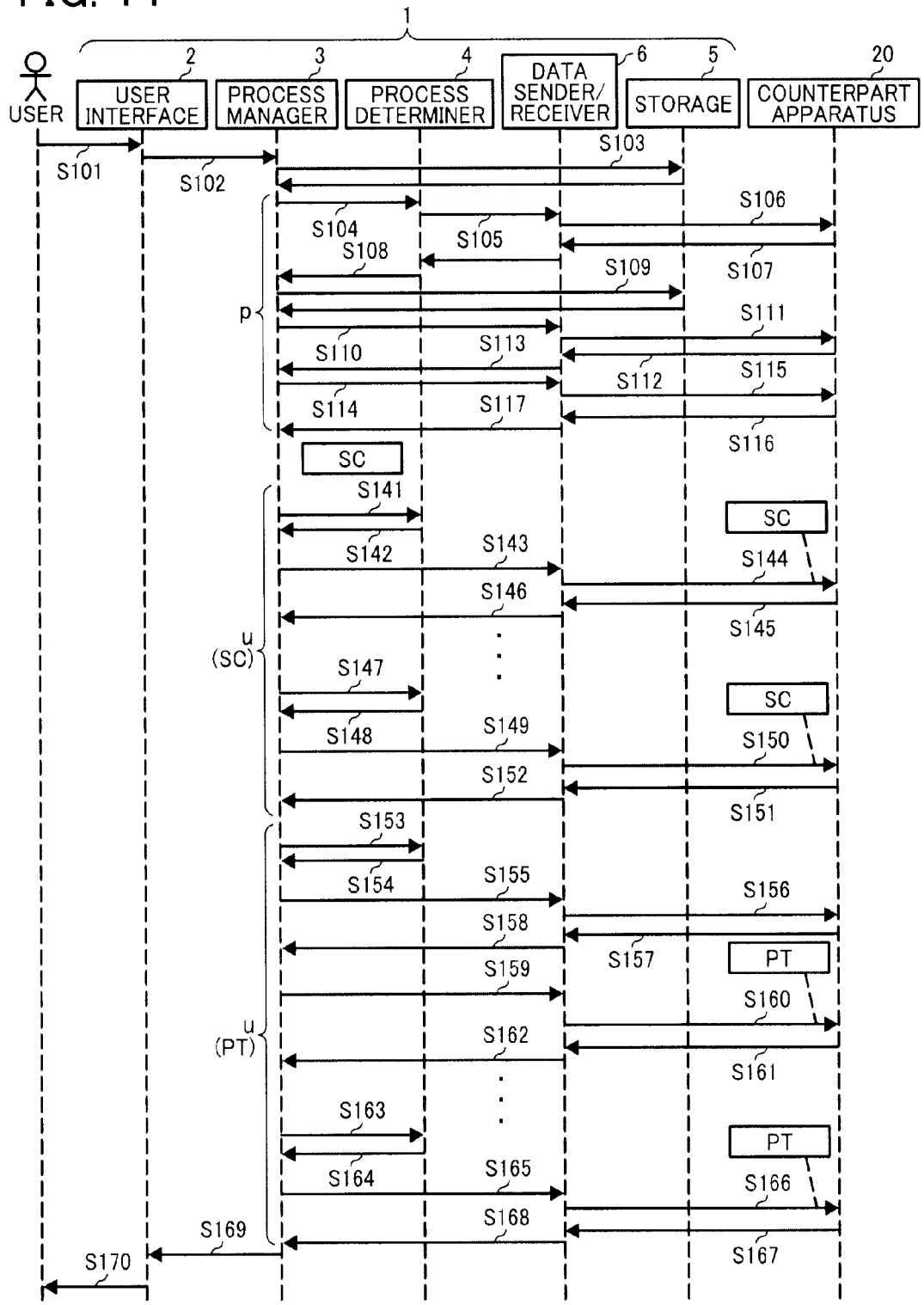
FIG. 14 is a data flow diagram illustrating operation of setting a counterpart apparatus through the device setting apparatus of FIG. 4, according to an example embodiment of the present invention.

Referring now to FIG. 14, operation of setting the counterpart apparatus 20, performed by the device setting apparatus 1, is explained in detail according to an example embodiment of the present invention. In this example, the device setting apparatus 1 performs operation of determining whether a specific procedure to be performed requires secure communication to generate a determination result. When the determination result indicates that the specific procedure requires secure communication, the device setting apparatus 1 sends a request for performing the specific procedure using secure communication. When the determination result indicates that the specific procedure does not require secure communication, the device setting apparatus 1 sends a request for performing the specific procedure without using secure communication.

Referring to FIG. 14, the steps S101 to S103, and S104 to S117 which correspond to the preparatory operation ("p"), are performed in a substantially similar manner as described above referring to the steps S101 to S117 of FIG. 6.

In this example, the operation of performing the user request differs depending on whether the procedure requires secure communication or not. When the procedure requires secure communication, the device setting apparatus 1 performs the user request using secure communication ("u(SC) "), as indicated by the steps S141 to S152 of FIG. 14 in a substantially similar manner as described above referring to S118 to S129 of FIG. 6. When the procedure does not require secure communication, the device setting apparatus 1 performs the user request using insecure communication ("u(PT) "), as indicated by the steps S153 to S169 of FIG. 14.

At S153, the process manager 3 instructs the process determiner 4 to determine whether the procedure to be performed next requires secure communication. At S154, the process determiner 4 determines that the procedure does not require secure communication by referring to the procedure list information 53 or the procedure check information 52 to generate a determination result, and sends the determination result to the process manager 3.

Based on the determination result indicating that secure communication is not required, at S155, the process manager 3 instructs the data sender/receiver 6 to send a communication setting change request to the counterpart apparatus 20. At S156, the data sender/receiver 6 sends the communication setting change request to the counterpart apparatus 20 in encrypted form using the HTTPS. When the communication setting change request is received, the counterpart apparatus 20 changes the communication setting from the secure communication setting previously set to the insecure communication setting. More specifically, in this example, the SSL setting is changed from the valid value to the invalid value. At S157, the counterpart apparatus 20 sends the OK response indicating that the communication setting has been changed to insecure communication. At S158, the data sender/receiver 6 sends the response to the process manager 3.

At S159, the process manager 3 instructs the data sender/receiver 6 to send a request for performing the next procedure to the counterpart apparatus 20 in an insecure manner. At S160, the data sender/receiver 6 sends a request for performing the next procedure to the counterpart apparatus 20 in plaintext form using the HTTP.

At S161, the counterpart apparatus 20 sends the OK response indicating that the next procedure is successfully performed. At S162, the data sender/receiver 6 sends the OK response to the process manager 3.

The steps S163 to S168 are sequentially performed in a substantially similar manner as described above referring to S153 to S154 and S159 to S162 for the following procedure. The steps S163 to S168 are repeated until all procedures listed in the procedure check information 52 are completed.

Upon completion of all procedures, at S169, the process manager 3 sends the process result to the user interface 2. At S170, the user interface 2 displays a screen indicating that the setting operation is successfully performed for display to the user, and the operation ends.

The exchange of data using secure communication usually requires more processing time as the both parties require calculation for encryption and decryption, thus increasing the work load. In order to reduce the processing time, the device setting apparatus 1 may cause to communicate with the counterpart apparatus 20 in an insecure manner when the secure communication is not required. In order to change the communication setting, at S155 and S156, the device setting apparatus 1 may cause the counterpart apparatus 20 to uninstall the certificate, for example, when the system requires to set the highest security level whenever available. When the certificate is uninstalled, the device setting apparatus 1 and the counterpart apparatus 20 communicate with each other in plaintext form using the HTTP.

Further, in the above-described example, the device setting apparatus 20 may firstly determine whether each procedure listed in the procedure check information 52 requires secure communication, and classifies the procedures into the first group requiring secure communication and the second group not requiring secure communication. In this manner, the device setting apparatus 1 is able to send a request in encrypted form using the HTTPS for the procedures belonging to the first group, and further send a request in plaintext form using the HTTP for the procedures belonging to the second group.

<Example Operation of Setting the Counterpart Apparatus>

Figure 15:
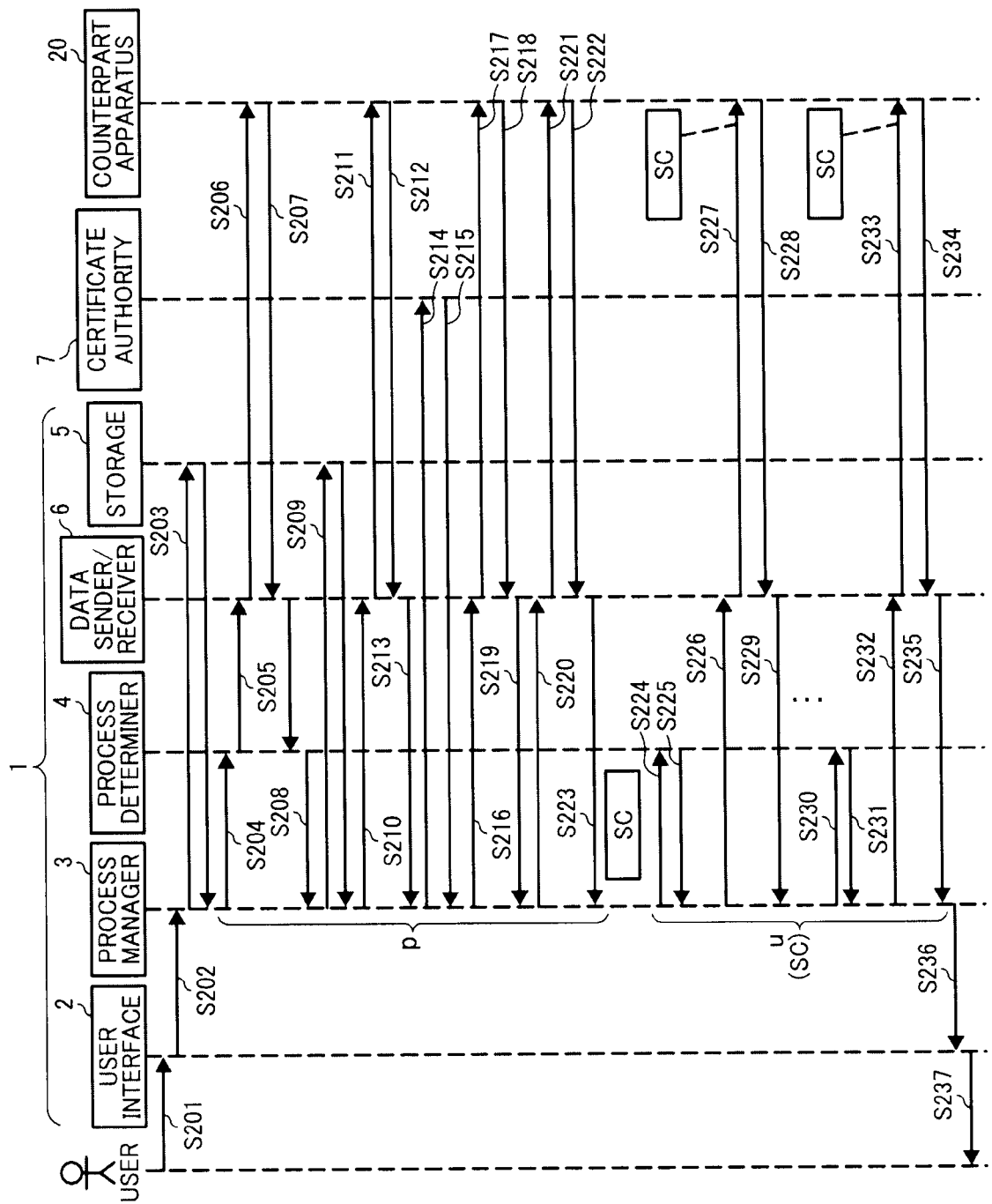
FIG. 15 is a data flow diagram illustrating operation of setting a counterpart apparatus through the device setting apparatus of FIG. 4, according to an example embodiment of the present invention.

Referring now to FIG. 15, operation of setting the counterpart apparatus 20, performed by the device setting apparatus 1, is explained according to an example embodiment of the present invention. In this example, the device setting apparatus 1 additionally performs operation of having a certificate authority sign the certificate to be installed onto the counterpart apparatus 20, in response to a request sent by the counterpart apparatus 20.

Referring to FIG. 15, the steps S201 to S209 are performed in a substantially similar manner as described above referring to the steps S101 to S109 of FIG. 6. The operation of FIG. 15 additionally performs S210 to S219 to cause the counterpart apparatus 20 to generate a certificate with a request to sign the certificate (CSR). More specifically, at S210, the process manager 3 causes the data sender/receiver 6 to send a CSR creation request to the counterpart apparatus 20 to request the counterpart apparatus 20 to create a CSR. At this time, any information that may be used to generate the CSR may be sent together with the request including a public key. At S211, the sender/receiver 6 sends a CSR creation request in plaintext using the HTTP to the counterpart apparatus 20 to cause the counterpart apparatus 20 to create a CSR.

At S212, the data sender/receiver 6 receives the response from the counterpart apparatus 20 indicating that creation of the CSR is successful. At S113, the data sender/receiver 6 sends the response to the process manager 3.

At S214, the process manager 3 causes the certificate authority 7 to sign the certificate, for example, with a private key of the certificate authority 7. At S215, the certificate authority 7 sends the signed certificate to the process manager 3.

At S216, the process manager 3 causes the data sender/receiver 6 to send a certificate install request to the counterpart apparatus 20. At S217, the data sender/receiver 6 sends the certificate install request to the counterpart apparatus 20 in plaintext using the HTTP.

At S218, the data sender/receiver 6 receives the response from the counterpart apparatus 20 indicating that installation of the certificate is successful. At S219, the data sender/receiver 6 sends the response to the process manager 3.

The steps S220 to S223 may be performed in a substantially similar manner as described above referring to S114 to S117 of FIG. 6.

The operation of performing the user request ("u") may be performed in a substantially similar manner as described above referring to FIG. 6 or 14.

As described above referring to S210 to S219 of FIG. 15, the device setting apparatus 1 causes the counterpart apparatus 20 to create a CSR specific to the counterpart apparatus 20. More specifically, the device setting apparatus 1 obtains CSR creating procedure information specifying a procedure of creating a CSR for the counterpart apparatus 20 from the procedure list information 53 stored in the storage 5, and executes operation of creating a CSR according to the CSR creating procedure information.

In this example, the CSR creating procedure information is stored in the form of a table illustrated in FIG. 16. In order to allow any other apparatus on the network 30 to use the signed certificate, the certificate authority 7 needs to be selected such that the other apparatus can trust.

After creating the CSR according to the CSR creating procedure information of FIG. 16, the device setting apparatus 1 sends the certificate to the certificate authority 7 for signature. The signed certificate may be installed onto the counterpart apparatus 20, for example, according to the certificate install procedure information of FIG. 17.

As described above referring to FIGS. 15 to 17, the device setting apparatus 1 may be provided with the CSR creating procedure information and the certificate install procedure information in the storage 5 as the procedure list information 53. According to the procedure list information 53, the device setting apparatus 1 may automatically execute operation of causing the device setting apparatus 20 to create a CSR and have the certificate authority 7 sign the CSR to create the signed certificate. This further improves the security of the device setting system of FIG. 2. In this example, a certificate authority may be any desired trusted third party, which may be provided outside the device setting apparatus 1, including, for example, a certificate authority associated with instructions or governments or a commercial certificate authority.

Figure 18:
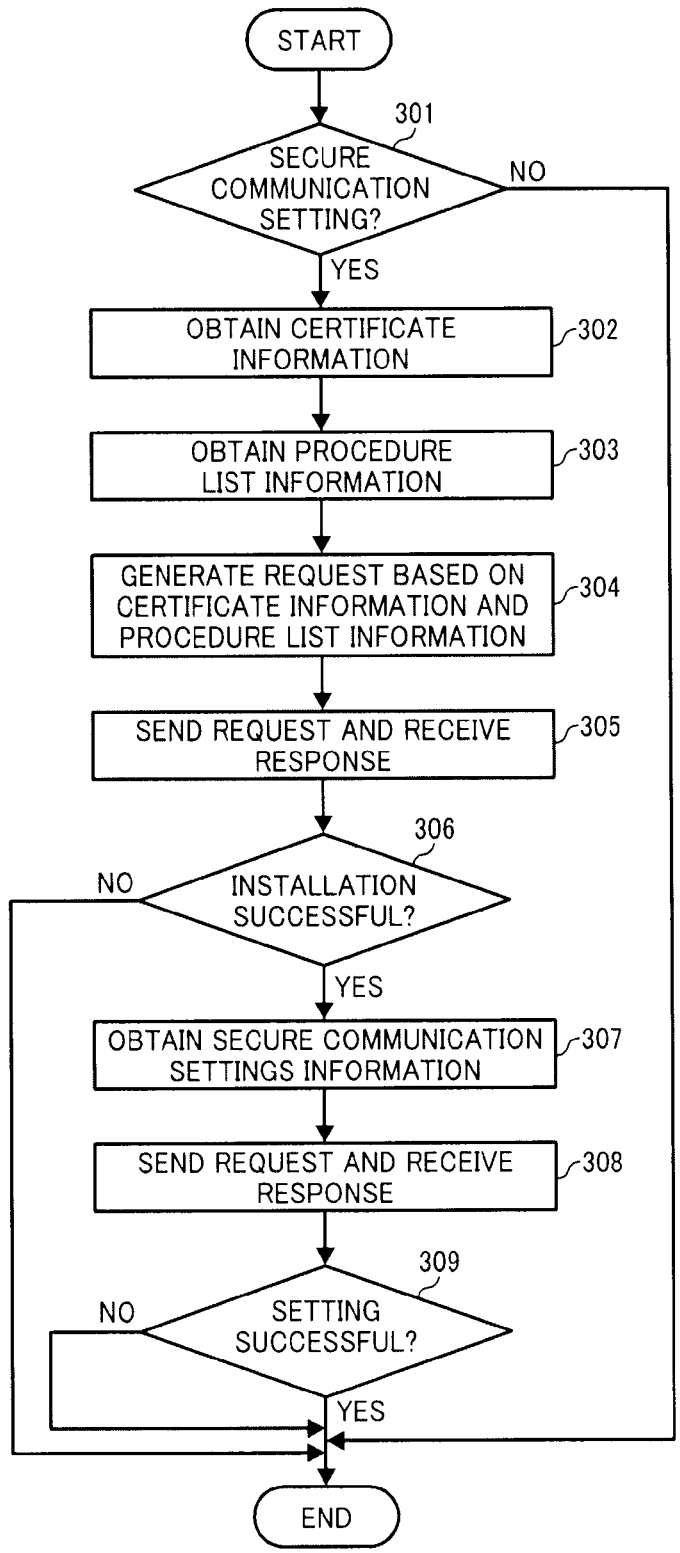
FIG. 18 is a flowchart illustrating operation of performing preparatory operation of setting secure communication for the counterpart apparatus, performed by the device setting apparatus of FIG. 4.

Referring now to FIG. 18, operation of performing preparatory operation for causing the counterpart apparatus 20 to set secure communication, performed by the device setting apparatus 1, is explained according to an example embodiment of the present invention.

At S301, the device setting apparatus 1 determines whether operation of setting secure communication is required, for example, by sending a secure communication request to the counterpart apparatus 20. When it is determined that secure communication setting is required ("YES" at S301), the operation proceeds to S302. When it is determined that secure communication is not required ("NO" at S301), the operation ends to proceed to the operation of performing the user request.

At S302, in order to start operation of creating and installing a certificate, the device setting apparatus 1 obtains certificate information required for creating the certificate specific to the counterpart apparatus 20 from the storage 5.

At S303, the device setting apparatus 1 obtains procedure list information from the storage 5, which specifies one or more processes to be performed in creating and installing the certificate.

At S304, the device setting apparatus 1 generates a request based on the certificate information and the procedure list information respectively obtained at the previous steps.

At S305, the device setting apparatus 1 sends the request to the counterpart apparatus 20, and receives the response from the counterpart apparatus 20 in response to the request. The steps S304 and S305 are repeated until all processes listed in the procedure list information are completed.

At S306, the device setting apparatus 1 determines whether installation of a certificate was successful, for example, by determining whether the response indicating that the certificate was installed is received from the counterpart apparatus 20. When it is determined that installation of the certificate was successful ("YES" at S306), the operation proceeds to S307. When it is determined that installation of the certificate was not successful ("NO" at S306), the operation ends in error.

At S307, in order to start operation of setting with secure communication settings information, the device setting apparatus 1 obtains the secure communication settings information from the storage 5. For example, the device setting apparatus 1 may obtain information indicating that the SSL setting should be set to the valid value to allow secure communication.

At S308, the device setting apparatus 1 sends a request to the counterpart apparatus 20 based on the secure communication settings information, and receives the response from the counterpart apparatus 20 in response to the request. For example, the device setting apparatus 1 may send a request that causes the counterpart apparatus 20 to set the SSL setting to have the valid value.

At S309, the device setting apparatus 1 determines whether setting of the secure communication settings information was successful, for example, by determining whether the response indicating that setting of the secure communication settings information was successful is received from the counterpart apparatus 20. When it is determined that setting of the secure communication settings information was successful ("YES" at S309), the operation ends to proceed to the operation of performing the user request. When it is determined that setting of the secure communication settings information was not successful ("NO" at S309), the operation ends in error.

<Example Preparatory Operation of Enabling the Counterpart Apparatus to Perform Secure Communication>

As described above referring to any one of FIGS. 6, 14 and 15, the device setting apparatus 1 may execute an operation of installing a certificate as described above referring to FIG. 13 when the counterpart apparatus 20 is not able to communicate in a secure manner.

In alternative to executing the operation of installing a certificate as described above referring to FIG. 13, the user at the device setting apparatus 1 may choose to manually install a certificate, for example, as described below referring to FIGS. 19A to 19H.

Figure 19A:
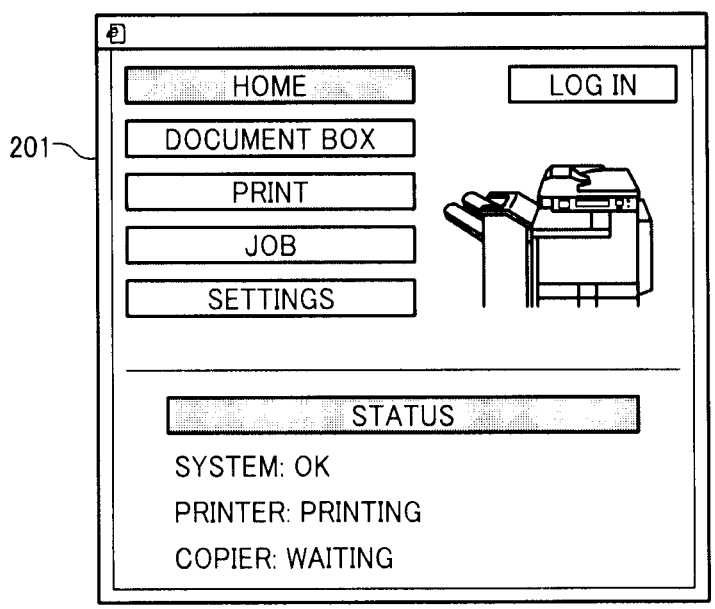
FIGS. 19A to 19H are an illustration for explaining screens displayed to a user at the device setting apparatus of FIG. 4 when the user manually performs operation of creating and installing a certificate onto the counterpart apparatus.

When the user at the device setting apparatus 1 specifies an address of the counterpart apparatus 20 subjected for setting operation through a browser of the device setting apparatus 101, the device setting apparatus 1 requests the counterpart apparatus 20 for a top webpage. The counterpart apparatus 102 sends the response with the top webpage to cause the device setting apparatus 1 to display a top webpage 201 on the user interface 2 as illustrated in FIG. 19A.

Figure 19B:
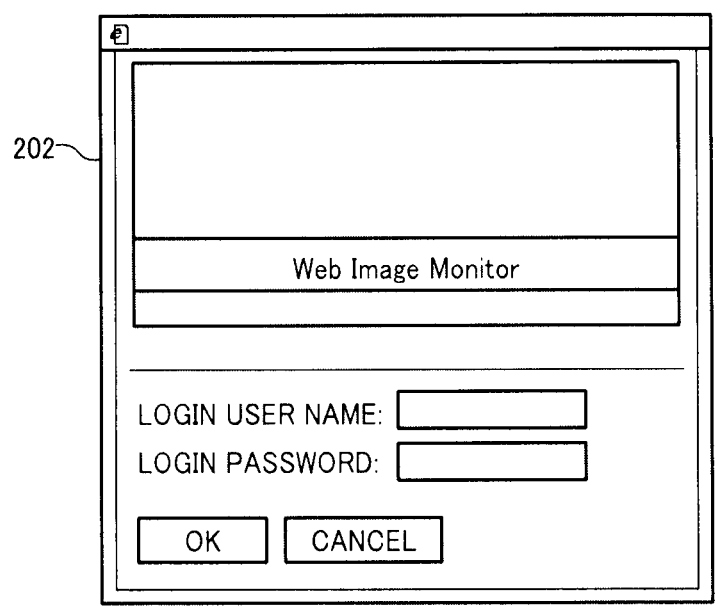

When the user selects the "LOG IN" button of the top webpage 201, the device setting apparatus 1 requests the counterpart apparatus 102 for a login page. The counterpart apparatus 20 sends the response with the login page to cause the device setting apparatus 1 to display a login page 202 on the user interface 2 as illustrated in FIG. 19B.

When the user selects the "OK" button after inputting the user name and the password through the login page 202, the device setting apparatus 1 sends a request to the counterpart apparatus 20 with the user name and the password. Assuming that the user authentication is successful, the counterpart apparatus 20 sends the "OK" response.

Figure 19C:
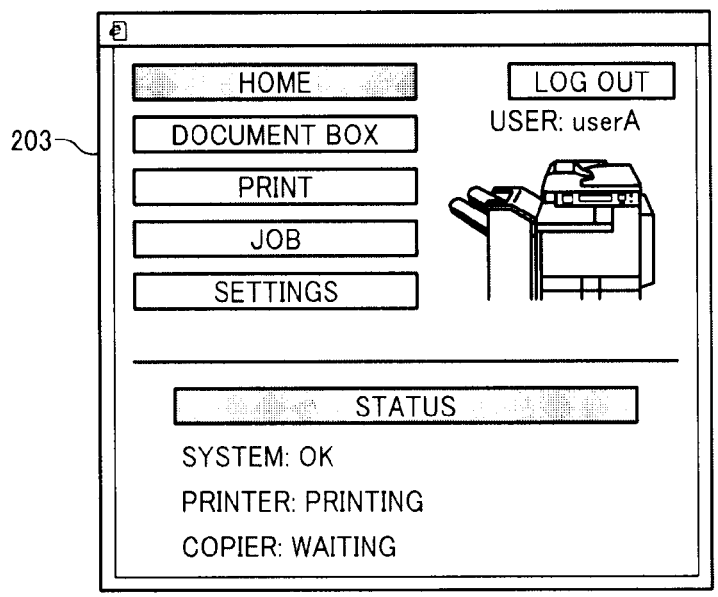

Further, the device setting apparatus 1 requests the counterpart apparatus 20 for the top webpage, and the counterpart apparatus 20 sends the response with the top webpage to the device setting apparatus 1 to display the top webpage 203 on the user interface 2 as illustrated in FIG. 19C.

Figure 19D:
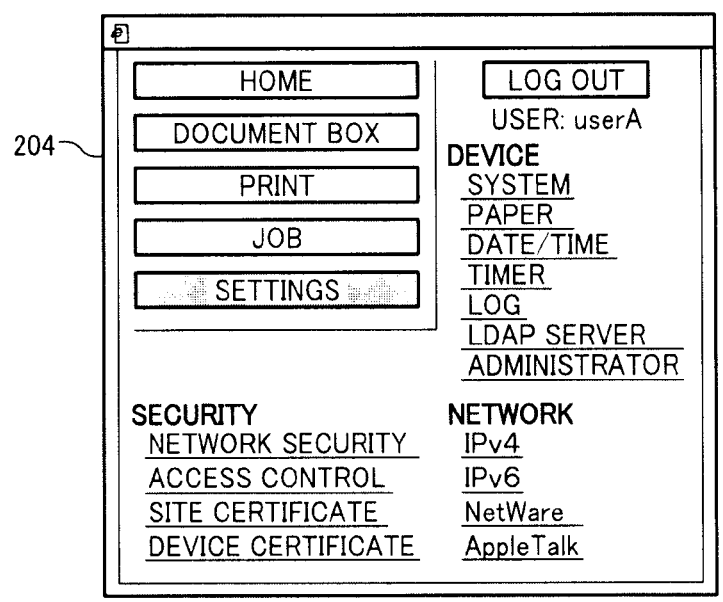

When the user selects the "SET" button of the top webpage 203, the device setting apparatus 1 requests the counterpart apparatus 20 for the setting page. The counterpart apparatus sends the response with the setting page to the device setting apparatus 1 to display the setting page 204 on the user interface 2 as illustrated in FIG. 19D.

Figure 19E:
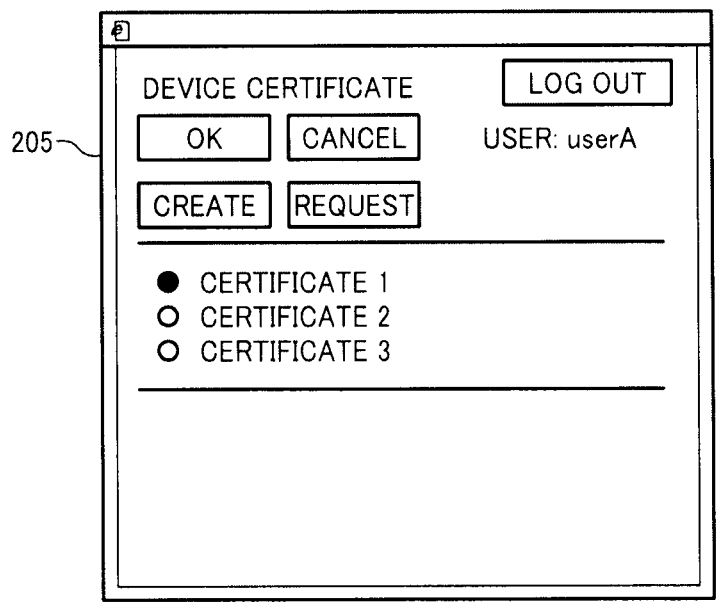

When the user selects the "DEVICE CERTIFICATE" item of the setting page 204, the device setting apparatus 1 requests the counterpart apparatus 20 for a certificate page. The counterpart apparatus 20 sends the response with the certificate page to the device setting apparatus 1 to display the certificate page 205 on the user interface 2 as illustrated in FIG. 19E.

Figure 19F:
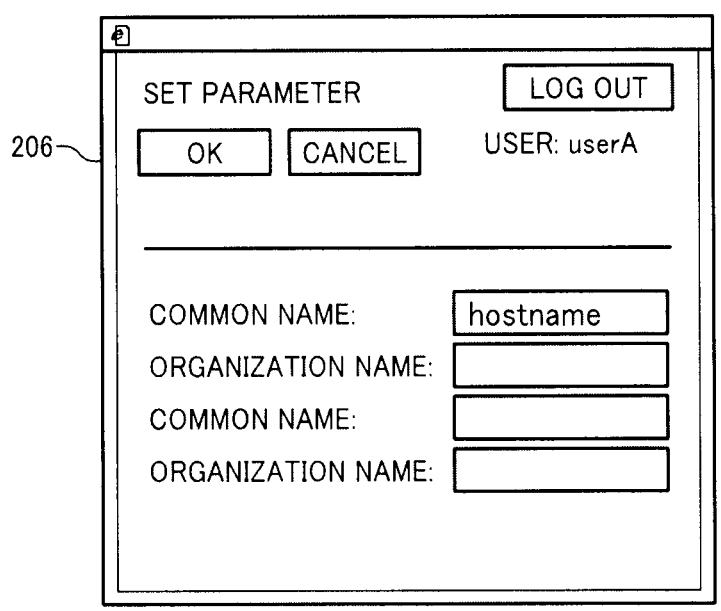

When the user selects the "CERTIFICATE 1" item from the certificate page 205 and presses the "CREATE" button, the device setting apparatus 1 requests the counterpart apparatus 20 for a certificate information input page. The counterpart apparatus 20 sends the response with the certificate information input page to the device setting apparatus 1 to display the certificate information input page 206 on the user interface 2 as illustrated in FIG. 19F.

Figure 19G:
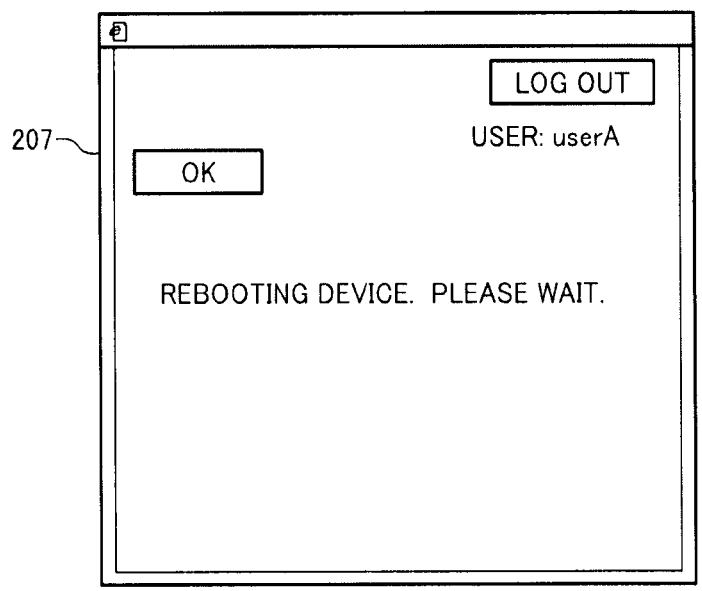

When the user selects the "OK" button of the certificate information input page 206 after inputting information regarding the certificate 1, such as a set of parameters for the certificate 1, the device setting apparatus 1 sends the information input by the user to the counterpart apparatus 20. The counterpart apparatus 20 receives the input information, and sends the response indicating that the counterpart apparatus is rebooted to the device setting apparatus 1. The device setting apparatus 1 displays a reboot message page 207 indicating that the counterpart apparatus 20 is rebooted as illustrated in FIG. 19G.

Figure 19H:
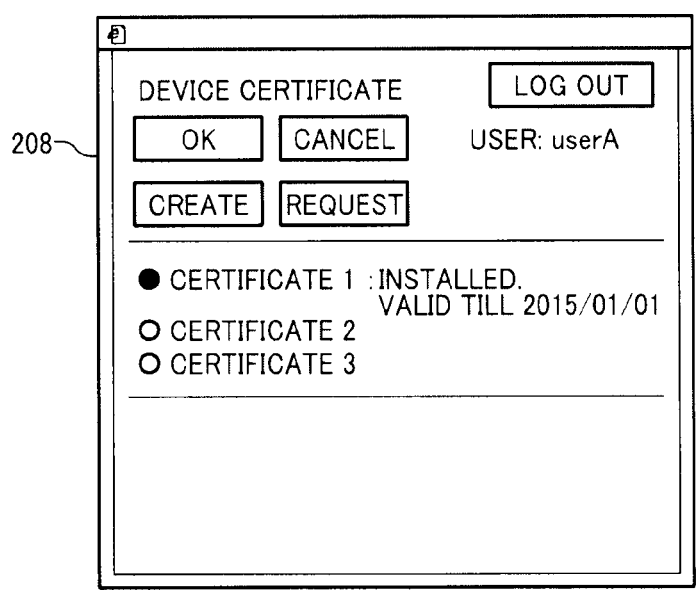

When the user selects the "OK" button of the reboot message page 207, the device setting apparatus 1 requests the counterpart apparatus 20 for an updated certificate page. The counterpart apparatus 20 receives the request, and sends the response to the device setting apparatus 1 with the updated certificate page. The device setting apparatus 1 displays the updated certificate page 208 on the user interface 2 as illustrated in FIG. 19H. The updated certificate page 208 is updated so as to include a message indicating that the certificate 1 has been created and installed. Through this information regarding the certificate 1 displayed on the updated certificate page, the user recognizes that the installing a certificate onto the counterpart apparatus 20 is successfully performed, and the operation ends.

In the example described above referring to FIGS. 19A to 19H, it is assumed that the user correctly inputs a set of parameters through the certificate information input page 206 of FIG. 19F. However, the user may incorrectly input a set of parameters through the certificate information input page 206 of FIG. 19F. In such case, the counterpart apparatus 20 causes the device setting apparatus 1 to display an updated certificate page 208 on the user interface 2 after rebooting in a substantially similar manner as described above referring to FIG. 19H. In this example, the updated certificate page 208 indicates that the set of parameters input by the user is not set due to the parameter error. Through this information regarding the certificate 1 displayed on the updated certificate page, the user recognizes that the setting of the counterpart apparatus 20 is not completed, and the operation ends.

When setting of the counterpart apparatus 20 ends in error, the device setting apparatus 101 stores the process result indicating that the setting operation failed. In order to correct an error, the user is required to perform the above-described operation of setting again. This may be cumbersome especially when a large number of counterpart apparatuses 20 needs to be set as the user may need to search for a specific counterpart apparatus 20 causing the error. Even after specifying the counterpart apparatus 20, the user needs to repeat the above-described operation of setting including the operation of logging in and the operation of creating the certificate.

This type of problem may arise even when the certificate is installed automatically by the device setting apparatus 1 as described above referring to FIG. 13 as long as information that is required for creating the certificate, such as the certificate information 51, is incorrectly stored in the storage 5. Further, the above-described type of problem may arise even when information regarding the counterpart apparatus such as the user name or the password of the administrator happens to be incorrect. Assuming that the device setting apparatus 1 is programmed to set a large number of counterpart apparatuses 20, once the error has occurred due to the incorrect data of the certificate information 51 stored in the storage 5, the device setting apparatus 1 repeatedly performs the operation of setting for all counterpart apparatuses 20 unless there is a function to correct such an error.

In view of the above, there is a need for the device setting apparatus 1 to additionally provide a function to assist the user in detecting the cause of an error when the error in setting operation occurs. Further, there is a need for the device setting apparatus 1 to additionally provide a function to correct an error when the error in setting operation occurs.

<Structure of Device Setting Apparatus>

Figure 20:
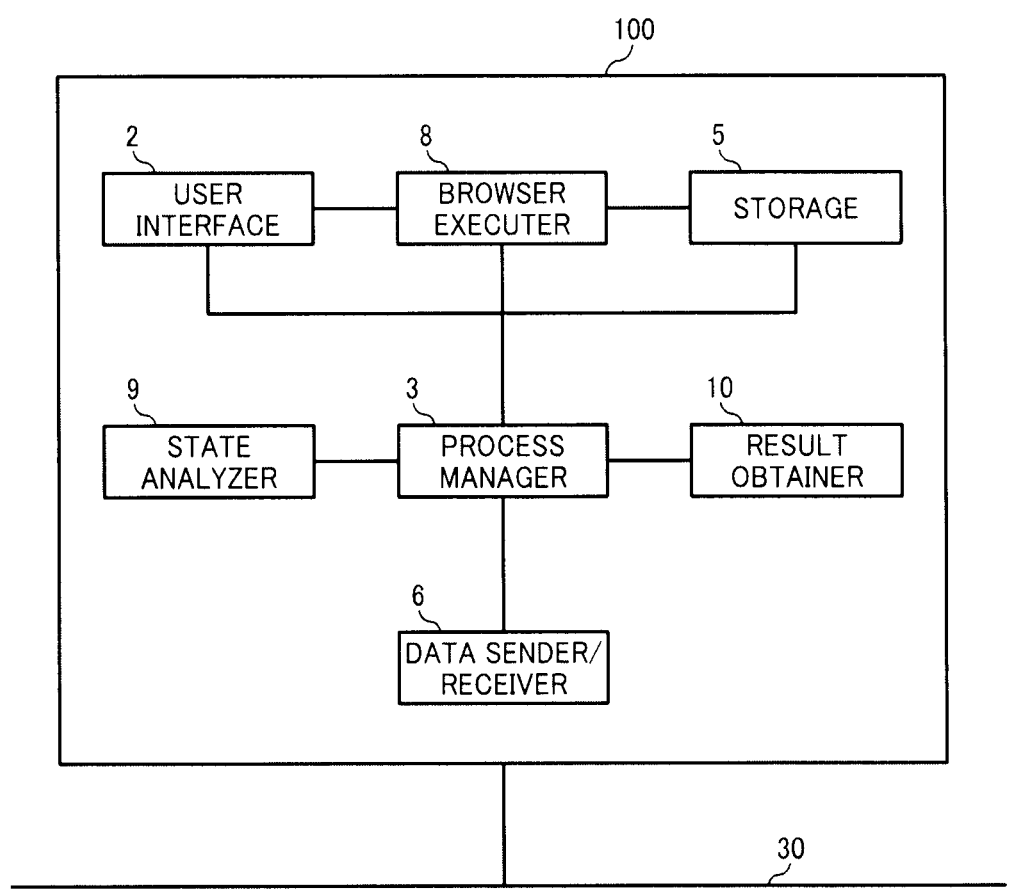
FIG. 20 is a schematic block diagram illustrating a functional structure of the device setting apparatus of FIG. 3, according to an example embodiment of the present invention.

Referring now to FIG. 20, a functional structure of the device setting apparatus 100 is explained according to an example embodiment of the present invention. The device setting apparatus 100 includes the user interface 2, the process manager 3, the storage 5, the data sender/receiver 6, a browser executer 8, a state analyzer 9, and a result obtainer 10. The user interface 2, the process manager 3, the storage 5, and the data sender/receiver 6 are substantially similar in structure and function to the user interface 2, the process manger 3, the storage 5, and the data sender/receiver 6 of FIG. 4.

The result obtainer 10 determines whether setting operation is successfully performed based on information obtained from the process manager 3.

The state analyzer 9 obtains information regarding a state of the counterpart apparatus 20 when an error has occurred ("the error state of the counterpart apparatus 20"), and notifies the process manager 3 of the information regarding the error state of the counterpart apparatus 20.

The browser executer 8 executes a browser application ("browser") so as to cause the user interface 2 to display a screen selected based on information regarding the error state of the counterpart apparatus 20 so as to request the user to input correct information. Any one of the result obtainer 10, the state analyzer 9, and the browser executer 8 may be implemented by the control unit 261 in cooperation with the other device such as the memory device.

<Example Operation of Setting Counterpart Apparatus>

Figure 21:
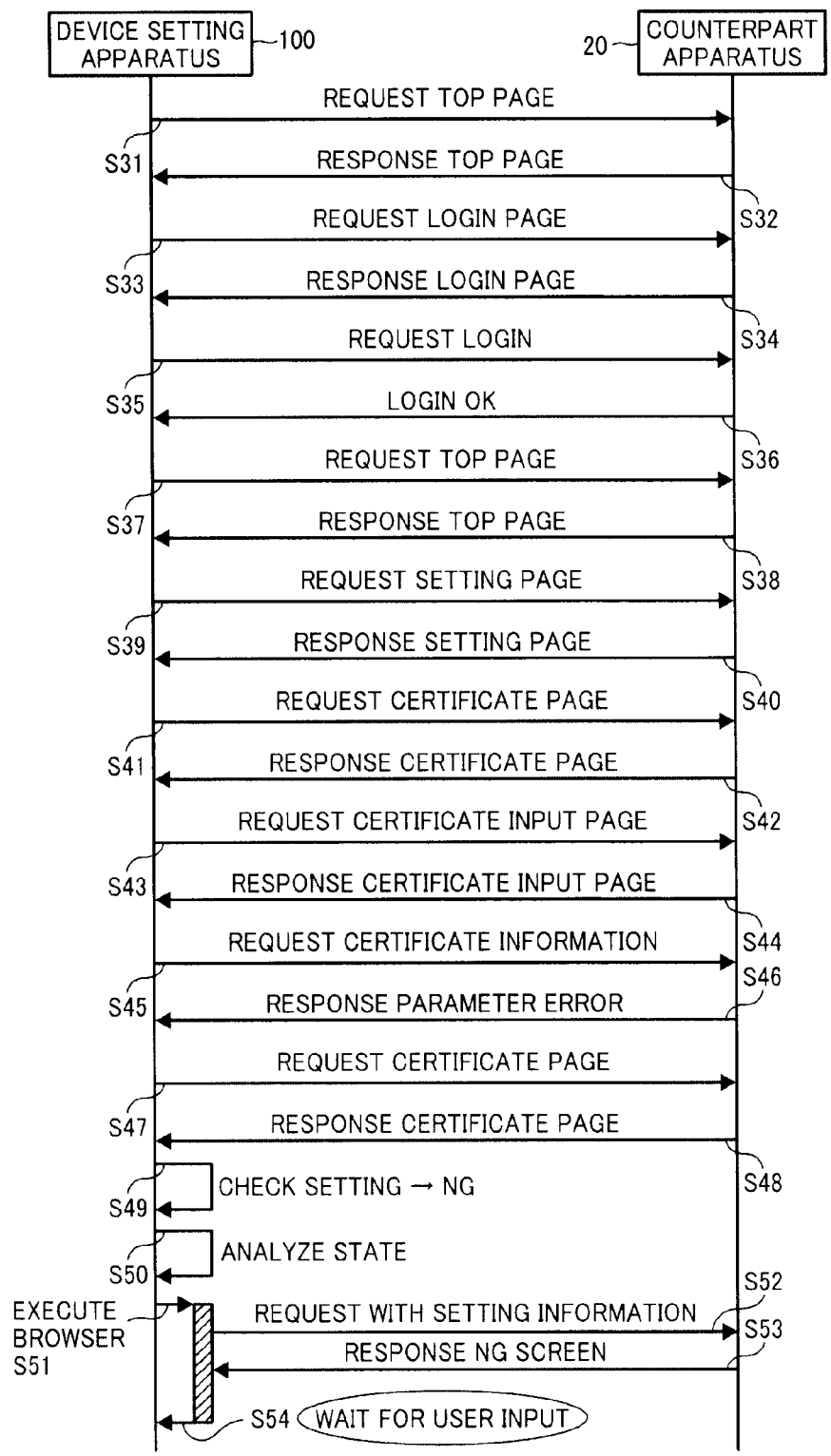
FIG. 21 is a data flow diagram illustrating operation of creating and installing a certificate for a counterpart apparatus while requesting a user to input information to correct an error detected during the operation of creating and installing, performed by the device setting apparatus of FIG. 20, according to an example embodiment of the present invention.

Referring to FIG. 21, operation of installing a certificate onto the counterpart apparatus 20, performed by the device setting apparatus 100 of FIG. 20, is explained according to an example embodiment of the present invention.

The operation of FIG. 21 may be performed by the device setting apparatus 100 in a substantially similar manner as described above referring to the operation of FIG. 13. In this example, the device setting apparatus 100 may automatically execute operation of creating and installing a certificate according to information stored in the storage 5. Alternatively, the device setting apparatus 100 may perform operation of creating and installing a certificate according to the user input as described above referring to FIGS. 19A to 19H. Further, in this example, the device setting apparatus 100 stores counterpart apparatus information regarding the counterpart apparatus 20 subjected for setting operation in the form of a table illustrated in FIG. 24, and certificate creation procedure information in the form of a table illustrated in FIG. 23.

The table of FIG. 24 includes the "No" field storing an arbitrary number assigned to each entry of the counterpart apparatus 20, and the "hostname" field storing apparatus identification information for identifying the counterpart apparatus 20. In this example, the apparatus identification information may be expressed using an IP address assigned to the counterpart apparatus 20.

The certificate creation procedure information of FIG. 23 includes the "No" field storing a number specifying the order of performing the processes, the "path" field storing path information of the request, the "method" field storing method information of the request, the "param 1" field storing a parameter value of the request, the "param 2" field storing a parameter value for the request, the "param 3" field storing a parameter value for the request, and the "expecting list" field storing an expected result of performing the procedure, the "priority" field storing priority information specifying the priority in browser execution, and the "condition" field storing a condition for browser execution.

In addition to the counterpart apparatus information of FIG. 24 and the certificate creation procedure information of FIG. 23, the storage 5 may store the certificate information 51 and the procedure check information 52.

For each one of the counterpart apparatus 20 listed in the apparatus table of FIG. 24, the device setting apparatus 100 determines whether operation of setting secure communication is required. When it is determined that operation of setting secure communication is required, the device setting apparatus 100 performs operation of creating and installing a certificate according to certificate creation procedure information of FIG. 23. More specifically, the process manager 3 generates a request based on information stored in the certificate creation procedure information and/or certificate information, and causes the data sender/receiver 6 to send the request to the counterpart apparatus 20.

Figure 22A:
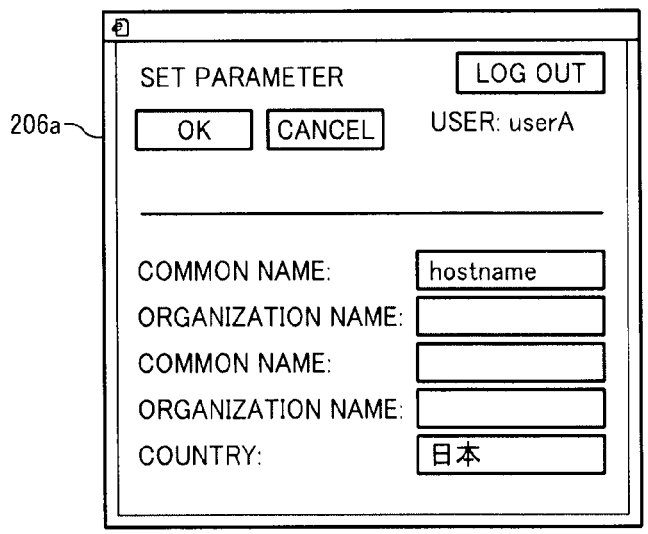
FIGS. 22A to 22C are an illustration for explaining a part of the screens displayed to a user at the device setting apparatus of FIG. 20 during the operation of FIG. 21.

Referring to FIG. 23, the device setting apparatus 100 sequentially performs requesting the top webpage of the counterpart apparatus 20, requesting the login page, logging in by providing the user name and the password using information stored in the storage 5, requesting the top webpage, requesting a setting page, requesting a certificate page, starting creation of a certificate 1(target is 1), setting "cn" as a hostname when creating a certificate 1, waiting for 30 seconds while the counterpart apparatus 20 is rebooted, and requesting a certificate page. This operation of setting secure communication may be performed in a substantially similar manner as described above referring to FIG. 13. However, in this example, it is assumed that an error in setting operation has occurred. For example, at S45 of FIG. 13, it is assumed that the device setting apparatus 100 has incorrectly input a parameter, which is the Japanese word for "Japan", in the country field in a screen 206a as illustrated in FIG. 22A. In such case, the device setting apparatus 100 additionally performs S50 to S54, as described below referring to FIG. 21.

Figure 22B:
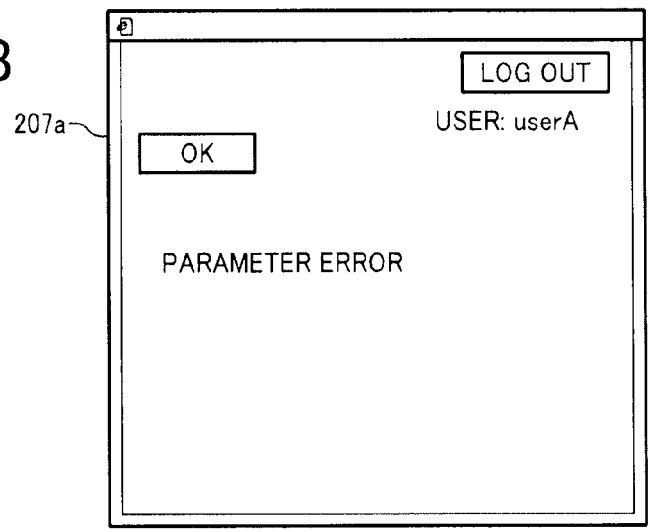

Referring to FIG. 21, at S46, the counterpart apparatus 20 sends the response indicating that the parameter error has occurred to the device setting apparatus 100. With this response, the device setting apparatus 100 may cause the user interface 2 to display a screen 207a including an error message as illustrated in FIG. 22B. With this error message, the user at the device setting apparatus 100 recognizes that an error has occurred. The user presses the "OK" button in the screen 207a.

While the counterpart apparatus 20 waits for being rebooted, at S47, the device setting apparatus 100 sends a request to the counterpart apparatus 20 for a certificate page. At S48, the counterpart apparatus 20 receives the request, and sends the response with the certificate page to the device setting apparatus 100.

At S49, the device setting apparatus 100 determines that the error has occurred based on the response received from the counterpart apparatus 20. More specifically, the result obtainer 10 refers to the certificate creation procedure information of FIG. 23 to obtain the expecting result specifying a message to be included in the certificate page when certificate installation is successful. Referring to FIG. 23, the expected result indicates that if the message "CERTIFICATE: INSTALLED" is included in the certificate page, it is determined that the certificate is successfully installed. The result obtainer 10 obtains the message included in the certificate page received from the counterpart apparatus 20 at S48, and compares it with the expecting result to determine whether certificate installation is successful. Since the message obtained from the certificate page received from the counterpart apparatus 20 indicates an error in this example, the result obtainer 10 sends a determination result indicating an error to the process manager 3.

At S50, the process manager 3 of the device setting apparatus 100 causes the state analyzer 9 to obtain an error state of the counterpart apparatus 20 when the error has occurred. More specifically, the state analyzer 9 specifies the error state of the counterpart apparatus 20 when the counterpart apparatus 20 receives a request from the device setting apparatus 100 having information that causes the error.

At S51, based on the error state of the counterpart apparatus 20 obtained by the state analyzer 9, the device setting apparatus 100 causes the browser executer 8 to execute a browser to display a screen that corresponds to the error state of the counterpart apparatus 20. In this example, the browser executer 8 causes the browser to display the screen of FIG. 22A through the user interface 2. In order to reproduce the screen of FIG. 22A, at S52, the device setting apparatus 100 sends the request to the counterpart apparatus 20 for the certificate information input page with a set of parameters input by the device setting apparatus 100. At S53, the device setting apparatus 100 receives the response from the counterpart apparatus 20 with the certificate information input page having the set of parameters.

Figure 22C:
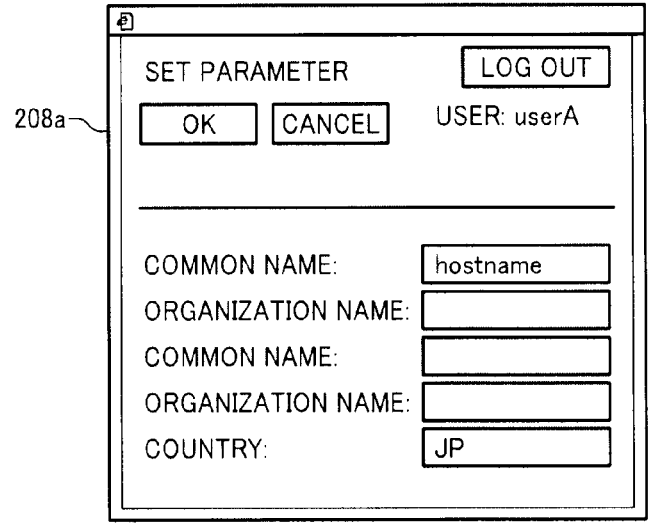

At S54, the device setting apparatus 100 requests the user to input a correct parameter value through the certificate information input page of FIG. 22A. As illustrated in FIG. 22C, the user may input a correct parameter value, which is the "JP", for the country field. After receiving the OK button from the user, the device setting apparatus 100 may display the reboot screen 207 as illustrated in FIG. 19G.

As described above, the device setting apparatus 100 causes the state analyzer 9 to obtain information regarding the error state of the counterpart apparatus 20 when an error occurs. Based on the error state of the counterpart apparatus 20, the device setting apparatus 100 executes a browser so as to reproduce a screen that corresponds to the error state of the counterpart apparatus 20 to the user. With this function, the user does not have to perform the setting operation all over again.

<Example Operation of Installing a Certificate onto the Counterpart Apparatus>

Figure 25:
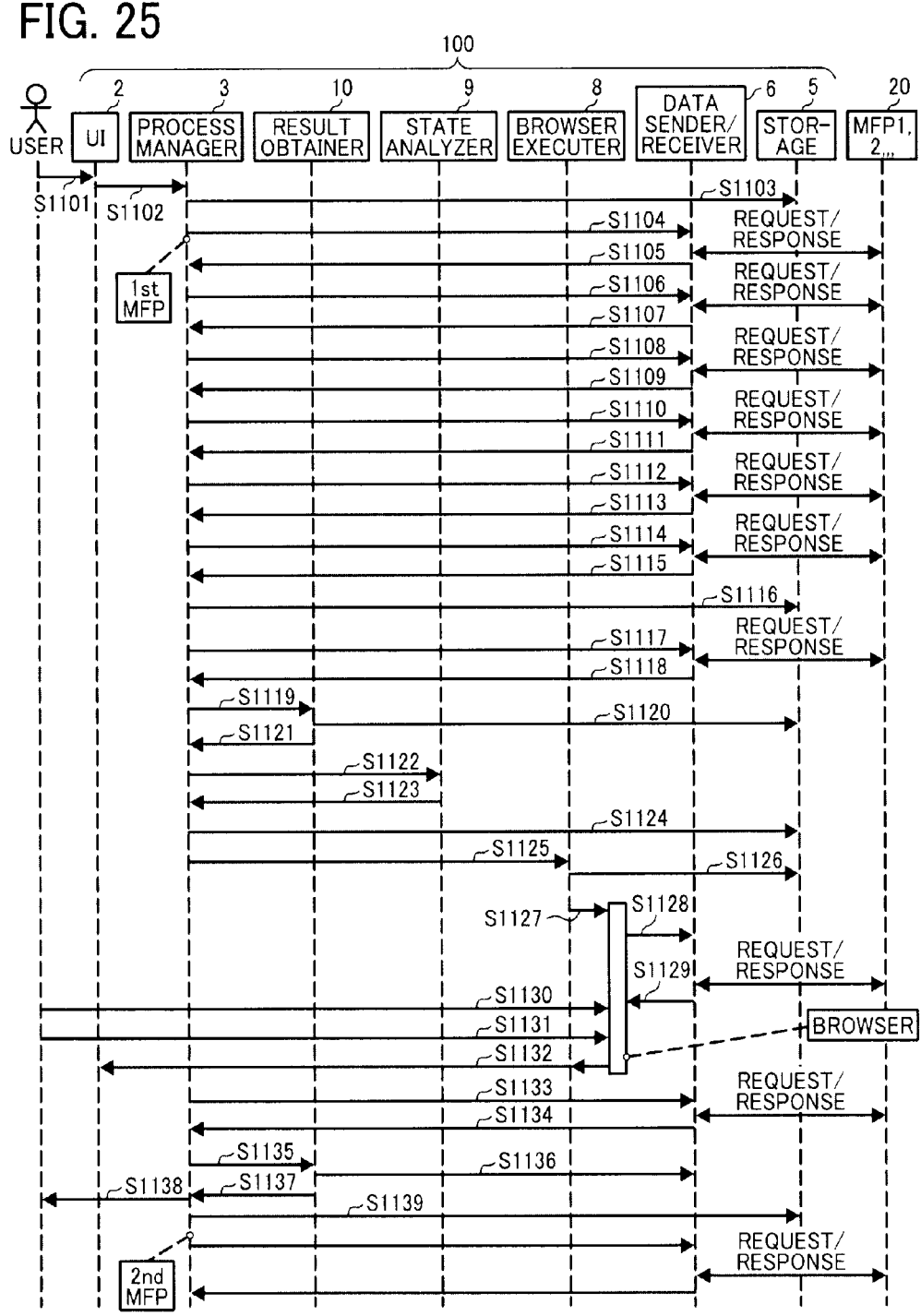
FIG. 25 is a data flow diagram illustrating operation of creating and installing a certificate for a counterpart apparatus through the device setting apparatus of FIG. 20, according to an example embodiment of the present invention.

Referring now to FIG. 25, operation of creating and installing a certificate onto the counterpart apparatus 20, performed by the device setting apparatus 100, is explained in detail according to an example embodiment of the present invention. In this example, the device setting apparatus 100 performs operation of creating and installing a certificate for two counterpart apparatus 20 including the first MFP and the second MFP. Assuming that the type of certificate is the same, the device setting apparatus 100 determines whether operation of creating and installing a certificate onto the first MFP is successful based on the processing result to generate a determination result. Based on the determination result, the procedure list information 53 and/or the certificate information 51 stored in the storage 5 may be updated before performing operation of creating and installing a certificate onto the second MFP.

At S1101, the user at the device setting apparatus 100 instructs the device setting apparatus 100 to perform an operation of creating and installing a certificate onto the first MFP through the user interface 2.

At S1102, the user interface 2 of the device setting apparatus 100 sends a user instruction for performing the operation of creating and installing a certificate to the process manager 3.

At S1103, the process manager 3 of the device setting apparatus 100 obtains information regarding the certificate creation and install operation such as the counterpart apparatus information regarding the apparatus subjected for certificate creation and install operation, and the procedure list information 53 specifying one or more processes to be performed to complete certificate creation and install operation, from the storage 5.

The steps S1104 to S1118 may be performed under control of the process manager 3 in a substantially similar manner as described above referring to FIG. 21. More specifically, the process manager 3 generates a request using information obtained from the procedure list information 53 and/or the certificate information 51, and causes the data sender/receiver 6 to send the request to the counterpart apparatus 20. Assuming that the device setting apparatus 100 incorrectly inputs information required for creating a certificate at S1114, at S1115, the data sender/receiver 6 sends the response indicating a parameter error received from the counterpart apparatus 20 to the process manager 3. For example, the counterpart apparatus 20 may send the rebooting page with an error message as illustrated in FIG. 22B.

At S1116, the process manager 3 stores the response such as the rebooting page with the error message in the storage 5 as the processing result. At this time, all parameters that have been input by the device setting apparatus 100 are kept, no matter whether information is correctly or incorrectly input.

At S1117, the process manager 3 sends the request to the counterpart apparatus 20 for a certificate page through the data sender/receiver 6. At S1118, the process manager 3 obtains the certificate page from the counterpart apparatus 20 through the data sender/receiver 6. The certificate page obtained at S1118 includes an error message specifying that certificate installation fails. The error message may indicate the type of an error, in this case, a parameter error.

At S1119, the process manager 3 sends the certificate page obtained at S1118 to the result obtainer 10, and instructs the result obtainer 10 to obtain a determination result indicating whether certificate installation was successful. At S1120, the result obtainer 10 compares the error message included in the obtained certificate page with the expecting result of the procedure list information 53 stored in the storage 5. Since the error message differs from the expecting result, the result obtainer 10 generates a determination result indicating that certificate installation fails. At S1121, the result obtainer 10 sends the determination result indicating an error to the process manager 3.

In this example, the result obtainer 10 may specify a type of error from the obtained certificate page, such as a parameter error. Further, in this example, the result obtainer 10 determines whether certification installation is successful by matching the character string of the error message with the character string stored as the expecting result. In alternative to character string matching, any desired method may be used as long as the result obtainer 10 is capable of detecting an error. For example, the result obtainer 10 may determine whether the error occurs based on a communication status or the type of image data such as the type of certificate page. In another example, the result obtainer 10 may determine whether the error occurs based on any information obtained from the response sent from the counterpart apparatus 20.

At S1122, the process manager 3 sends information regarding the obtained certificate page to the state analyzer 9 to instruct the state analyzer 9 to specify an error state of the counterpart apparatus 20 when the error occurs.

In this example, the state analyzer 9 specifies the error state of the counterpart apparatus 20 using the priority information and the condition information stored in the procedure list information of FIG. 23. The priority information indicates the priority order in which the device setting apparatus 100 should look for the error state. The state analyzer 9 searches through the table of FIG. 23 until two conditions match. Referring to the table of FIG. 23, the device setting apparatus 100 first checks the "createCert.cgi" state having the condition in which the apparatus 20 is logged on and a parameter error occurs, and compares this condition with information regarding the certificate page to determine that they match. The device setting apparatus 100 checks the "createCert.cgi" state having the condition in which the apparatus 20 is logged on, and compares this condition with information regarding the certificate page to determine that they match. Since two conditions match, the device setting apparatus 100 specifies the error state as the "createCert.cgi" state in which the device setting apparatus 100 enters certificate information through the certificate information input page.

At S1124, the process manager 3 writes information regarding the error state of the counterpart apparatus 20 in the storage 5 as Cookie information. The information regarding the error state includes a set of parameters that has been input by the device setting apparatus 100 through the certificate information input page.

At S1125, the process manager 3 causes the browser executer 8 to execute a browser, and instructs the browser 8 to obtain information regarding the error state from the Cookie information stored in the storage 5. At this time, the process manager 3 may notify the browser execute 8 that the certificate information input page is to be displayed.

At S1126, the browser executer 8 obtains the Cookie information from the storage 5. In this example, the Cookie information is generated in compliance with the technique disclosed in RFC issued by the Internet Engineering Task Force (IETF). The Cookie information is a mechanism for managing the state of HTTP used by a browser.

At S1127, the browser executer 8 executes the browser, and causes the browser to input information regarding the error state of the counterpart apparatus 20, which is obtained from the Cookie information. At S1128, the information regarding the error state is sent to the counterpart apparatus 20 through the data sender/receiver 6. At S1129, the counterpart apparatus 20 sends the certificate information input page in which the information regarding the error state is input to the data sender/receiver 6 for display to the user through the browser. At S1130, the user at the device setting apparatus 100 inputs correct information through the displayed certificate information input page.

At S1131, when the user presses the "OK" button, the browser closes. When the browser executer 8 detects closing of the browser, at S1132, the browser executer 8 notifies the process manager 3 that the browser is closed.

At S1133, the process manager 3 sends the request to the counterpart apparatus 20 for a certificate page through the data sender/receiver 6. At S1134, the process manger 3 obtains the certificate page received from the counterpart apparatus 20 through the data sender/receiver 6. At S1135, the process manager 3 sends the obtained certificate page to the result obtainer 10, and instructs the result obtainer 10 to determine whether certificate installation was successful. At S1136, the result obtainer 10 obtains the expecting result from the storage 5 to compare between the obtained certificate page and the expecting result to generate a determination result. Assuming that the determination indicates that certificate installation was successful, at S1137, the result obtainer 10 sends the determination result indicating that certificate installation was successful to the process manager 3.

At S1138, the process manager 3 may cause the user interface 2 to display a screen indicating that certificate installation was successful. At S1139, the process manager 3 overwrites the process result stored in the storage 5 at S1116. Further, the certificate information 51 and/or the procedure list information 53 may be updated to reflect the correct information so as to prevent the occurrence of an error.

The operation proceeds to perform operation of installing a certificate onto the second MFP in a substantially similar manner as described above. Since the information that causes an error has been corrected before performing operation with respect to the second MFP, operation of installing a certificate onto the second MFP should be performed without an error.

The above-described operation of creating and installing a certificate may be performed at any desired time, for example, before performing operation of performing the user request to set a plurality of procedures to complete the setting operation with respect to the counterpart apparatus 20.

Figure 26:
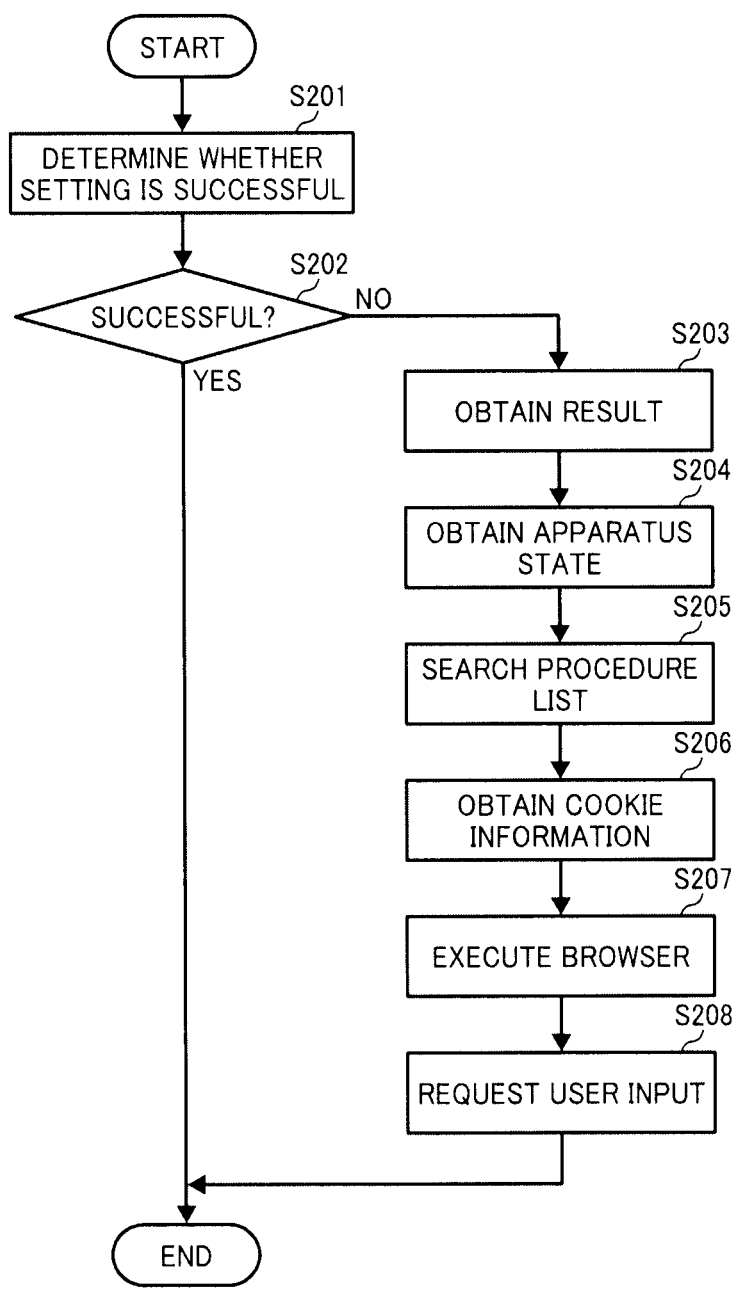
FIG. 26 is a flowchart illustrating operation of executing a browser in the middle of setting operation, performed by the device setting apparatus of FIG. 20, according to an example embodiment of the present invention.

Referring now to FIG. 26, operation of executing a browser, performed by the device setting apparatus 100, is explained according to an example embodiment of the present invention. The operation of FIG. 26 may be performed at S1119 to S1131 of FIG. 25, after the certificate creation and install operation is performed or after the setting operation is performed.

At S201, the process manager 3 determines whether the setting operation for the certificate is successfully performed to generate a determination result. When the determination result indicates that the setting operation fails ("NO" at S202), the operation proceeds to S203. When the determination result indicates that the setting operation is successful ("YES" at S202), the operation ends.

At S203, the process manager 3 obtains information regarding the processing result from the storage 5. The processing result may be a certificate page that reflects certificate information that has been input by the device setting apparatus 100.

At S204 and S205, the process manager 3 causes the state analyzer 9 to obtain information regarding the error state of the counterpart apparatus 20 when the error has occurred. More specifically, the error state of the counterpart apparatus 20 is the state of the counterpart apparatus 20 when a request that causes the error is received from the device setting apparatus 100.

In order to obtain the error state of the counterpart apparatus 20, at S204, the device setting apparatus 10 obtains a current state of the counterpart apparatus 20, for example, by checking the type of an error occurred or the login status. Further, at S205, based on the obtained current state of the counterpart apparatus 20, the process manager 3 searches through the procedure list information of FIG. 23 to obtain the error state of the counterpart apparatus 20. For example, the devices setting apparatus 100 checks whether two conditions listed in the procedure list information 53 of FIG. 23 match by checking in the order specified by the priority order information. In this example, the error state may be expressed in terms of a webpage.

At S206, when the error state is obtained, the process manager 3 obtains Cookie information describing the processing result of the error state from the storage 5.

At S207, the browser executer 8 executes a browser to call the webpage that matches the error state and having the processing result obtained using the Cookie information.

At S207, the process manager 3 requests the user to input information to correct the error through the webpage, and the operation ends.

The above-described example describes the case in which an error occurs in operation of creating and installing a certificate. Alternatively, the device setting apparatus 100 may cause a browser to execute in the middle of setting operation even when an error occurs in operation of logging in or operation of setting a specific parameter as a part of operation of performing the user request.

As described above referring to FIGS. 20 to 26, the device setting apparatus 100 is capable of executing a browser during the setting operation when an error in setting operation is detected. This reduces the overall workload for the user. Further, when the error is detected, the device setting apparatus 100 analyzes an error state of the counterpart apparatus 20 when the error occurs such as when a request that causes the error is received from the device setting apparatus 100. The browser executer causes the browser to display a screen based on information regarding the error state of the counterpart apparatus 20. Since the browser displays the screen that reflects the error state, the browser does not have to request the user to start setting operation all over again. Further, the device setting apparatus 100 stores information regarding the processing result of performing the setting operation in the storage. Using the information regarding the error state of the counterpart apparatus 20, the device setting apparatus 100 obtains the incorrect input information previously input by the device setting apparatus 100 that causes the error, and causes the browser to display the screen including the incorrect input information. This helps the use to recognize the cause of the error. When the device setting apparatus 100 receives a user input that replaces the incorrect input information with newly input information, the device setting apparatus 100 determines whether the setting operation is successful using the newly input information to generate a determination result, and overwrites the determination result that has been stored within the new determination result. This further reduces the overall workload of the user as the device setting apparatus 100 is capable of smoothly proceeding to the next operation in case there is any other counterpart 20 for setting operation.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, the operation of FIG. 18 performed by the device setting apparatus 1 of FIG. 4 may be performed differently when the device setting apparatus 1 is capable of allowing the device setting apparatus 1 to correct an error. In such case, when the error is detected, for example, at S306 or S309, the operation proceeds to the operation of browser execution described above referring to FIG. 26.

Further, the example of secure communication is not limited to the above-described example case of using the SSL/TLS with public key cryptography. Further, the communication interface protocol is not limited to HTTP or HTTPS such that any communication interface protocol such as SOAP may be used as long as the security level is kept high.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: a device setting apparatus that receives a web page generated by a counterpart apparatus subjected for setting operation and performs setting operation with respect to the counterpart apparatus. The device setting apparatus includes: means for sending a request in encrypted form to the counterpart apparatus; means for receiving a response in response to the request from the counterpart apparatus; means for obtaining information indicating whether the counterpart apparatus is capable of performing secure communication; means for sending information that enables the counterpart apparatus to perform secure communication to the counterpart apparatus when it is determined that the counterpart apparatus is not capable of performing secure communication.

In this example, the information that enables the counterpart apparatus to perform secure communication relates to a secret key used for creating a certificate.

In this example, the device setting apparatus further includes: means for sending a request in the unencrypted form to the counterpart apparatus; and means for obtaining information indicating whether secure communication is required for setting. Based on the information indicating whether secure communication is required for setting, the means for sending a request in encrypted form and the means for sending a request in the unencrypted form is selectively operated.

In this example, the information that enables the counterpart apparatus to perform secure communication is a digital signature sent in response to a request for signature obtained from the counterpart apparatus.

In this example, the device setting apparatus further includes: means for determining whether setting operation is successfully performed; means for analyzing a state of the counterpart apparatus; and means for executing a browser in the middle of the setting operation. When the means for determining determines that setting operation is not correctly performed, the means for executing executes a browser based on an error state of the counterpart apparatus when the detected error has occurred so as to request the device setting apparatus to perform setting operation again.

In this example, the device setting apparatus further includes: means for storing the processing result of the setting operation. The means for determining determines whether setting operation is correctly performed based on the processing result stored in the means for storing. The means for analyzing analyzes the error state of the counterpart apparatus based on the processing result indicating the error detected by the means for determining.

In this example, the means for executing a browser includes: means for detecting closing of the browser. When the browser is closed, the browser causes the means for determining to determine whether setting operation is correctly performed again and overwrites the processing result with a newly obtained processing result for display.

In another example, the present invention may reside in a method of receiving a web page generated by a counterpart apparatus subjected for setting operation and performing setting operation with respect to the counterpart apparatus. The method includes: storing a procedure for setting operation; sending a request to the counterpart apparatus for requesting a predetermined webpage; receiving a response sent from the counterpart apparatus in response to the request; determining whether setting operation is correctly performed in response to the request; and executing a browser in the middle of setting operation when it is determined that setting operation is not correctly performed so as to allow the device setting apparatus to set under the state when the error has occurred.

In another example, the present invention may reside in: a recording medium storing a plurality of instructions that cause a processor to perform device setting method of setting a counterpart apparatus through a network using a device setting apparatus. The method includes: storing, in a storage device, information specifying a procedure to be performed by the device setting apparatus to cause the counterpart apparatus to perform a user request; determining whether the counterpart apparatus is capable of performing secure communication to generate a determination result; executing operation of setting secure communication for the counterpart apparatus according to the determination result indicating that the counterpart apparatus is not capable of performing secure communication; and sending a request for performing the user request from the device setting apparatus to the counterpart apparatus using a secure communication interface protocol.

In the above-described example, the operation of setting secure communication includes at least one of: sending a certificate install request, using an insecure communication interface protocol, that causes the counterpart apparatus to create and install a certificate required for the counterpart apparatus to communicate with the device setting apparatus using the secure communication interface protocol; and sending a secure communication setting request, using an insecure communication interface protocol, that causes the counterpart apparatus to set the communication setting to have a value that requires the secure communication interface protocol.

In the above-described example, the operation of setting secure communication further includes: causing the counterpart apparatus to create a certificate signing request (CSR) that requests a certificate authority to sign the certificate; transmitting the CSR created by the counterpart apparatus to the certificate authority to have the certificate authority sign the certificate; and installing the signed certificate onto the counterpart apparatus.

In the above-described example, the method further includes: generating a determination result indicating that the procedure to be performed by the device setting apparatus to cause the counterpart apparatus to perform a user request does not require secure communication; and causing the counterpart apparatus to change the communication setting from the value that requires the secure communication interface protocol to a value that requires the insecure communication interface protocol; causing the counterpart apparatus to change the communication setting from the value that requires the secure communication interface protocol to a value that requires the insecure communication interface protocol; and sending the request for performing the user request from the device setting apparatus to the counterpart apparatus using the insecure communication interface protocol.

In the above-described example, the method further includes: generating a determination result indicating that an error has occurred when a setting operation is not successfully performed, the setting operation including the operation of setting secure communication and the operation of performing the user request; specifying a state of the counterpart apparatus when a request that causes the error is received by the counterpart apparatus from the device setting apparatus as an error state of the counterpart apparatus; and executing a browser based on information regarding the error state of the counterpart apparatus so as to cause the device setting apparatus to display a screen corresponding to the error state of the counterpart apparatus.

What is claimed is:

1. A device setting apparatus configured to connect to a counterpart apparatus through a network, the device setting apparatus comprising:
   a storage device configured to store information specifying a procedure to be performed by the device setting apparatus to cause the counterpart apparatus to perform a user request;
   a communication device configured to send a secure communication request to the counterpart apparatus to start secure communication via a secure interface protocol;
   a processor including
      a process determiner device configured to determine whether the counterpart apparatus is capable of performing secure communication based on whether a response is received by the communication device in response to the secure communication request and contents of the response when the response is received in response to the secure communication request to generate a first determination result; and
      a process manager device configured to execute operation of setting secure communication for the counterpart apparatus according to the determination result indicating that the counterpart apparatus is not capable of performing secure communication, and to cause the communication device to send a request for performing the user request to the counterpart apparatus using a secure communication interface protocol or an insecure communication interface protocol, wherein
   after the operation of setting the secure communication for the counterpart apparatus is executed, the process determiner device determines whether the procedure to be performed by the device setting apparatus to cause the counterpart apparatus to perform a user request is one of one or more procedures that require secure communication or one of one or more procedures that do not require secure communication to generate a second determination result, and when the second determination result indicates that the procedure is one of one or more procedures that do not require secure communication, the process manager device causes the communication device to
      send a communication setting change request to the counterpart apparatus that causes the counterpart apparatus to change a communication setting from a value that requires the secure communication interface protocol to a value that requires the insecure communication interface protocol; and
      send the request for performing the user request to the counterpart apparatus using the insecure communication interface protocol.

2. The device setting apparatus of claim 1, wherein the execution of operation of setting secure communication causes the communication device to send a request to the counterpart apparatus using an insecure communication interface protocol, the request being at least one of:
   a certificate install request that causes the counterpart apparatus to create and install a certificate required for the counterpart apparatus to communicate with the device setting apparatus using the secure communication interface protocol; and
   a secure communication setting request that causes the counterpart apparatus to set a communication setting to have a value that requires the secure communication interface protocol.

3. The device setting apparatus of claim 2, wherein the execution of operation of setting secure communication further causes the communication device to:
   send a certificate signing request (CSR) creating request that causes the counterpart apparatus to create a CSR that requests a certificate authority to sign the certificate;
   receive the CSR created by the counterpart apparatus to have the certificate authority sign the certificate; and
   send a signed certificate install request that causes the counterpart apparatus to install the signed certificate onto the counterpart apparatus.

4. The device setting apparatus of claim 2, wherein the storage device further includes:
   certificate creation procedure information specifying a procedure to be performed by the device setting apparatus to cause the counterpart apparatus to create and install the certificate; and
   certificate information used for creating the certificate, and the process manager device is configured to generate the certificate install request according to the certificate creation procedure information and the certificate information.

5. The device setting apparatus of claim 4, wherein the certificate information used for creating the certificate includes information regarding a private key of the counterpart apparatus, the private key being used by the counterpart apparatus for signing the certificate.

6. The device setting apparatus of claim 2, further comprising:
a result obtainer device configured to determine whether a setting operation is successfully performed and to generate a determination result indicating that an error has occurred when the setting operation is not successfully performed, the setting operation including the operation of setting secure communication and the operation of performing the user request;
a state analyzer device configured to specify a state of the counterpart apparatus when a request that causes the error is received from the device setting apparatus as an error state of the counterpart apparatus; and
a browser executer device configured to execute a browser based on information regarding the error state of the counterpart apparatus so as to cause the device setting apparatus to display a screen corresponding to the error state of the counterpart apparatus.

7. The device setting apparatus of claim 6, wherein:
the storage device further includes information regarding the processing result of performing the setting operation, and
the browser executer device is configured to obtain previously input information previously input by the device setting apparatus that causes the error from the storage device and cause the screen to include the previously input information for display.

8. The device setting apparatus of claim 7, wherein:
the browser executer device is further configured to receive newly input information input by the device setting apparatus in place of the previously input information displayed through the screen, and notify the process manager device upon detection of closing of the browser, and
the process manager device is further configured to cause the result obtainer device to determine whether the setting operation is successfully performed using the newly input information to generate a new determination result, and to overwrite the determination result indicating that an error has occurred stored in the storage device with the new determination result.

9. A device setting method of setting a counterpart apparatus through a network using a device setting apparatus, the method comprising:
storing, in a storage device, information specifying a procedure to be performed by the device setting apparatus to cause the counterpart apparatus to perform a user request;
sending a secure communication request to the counterpart apparatus to start secure communication via a secure interface protocol;
determining whether the counterpart apparatus is capable of performing secure communication based on whether a response is received by the device setting apparatus in response to the secure communication request and contents of the response when the response is received in response to the secure communication request to generate a first determination result;
executing operation of setting secure communication for the counterpart apparatus according to the first determination result indicating that the counterpart apparatus is not capable of performing secure communication; and
sending a request for performing the user request from the device setting apparatus to the counterpart apparatus using a secure communication interface protocol or an insecure communication interface protocol, wherein
after the operation of setting the secure communication for the counterpart apparatus is executed, the device setting method further comprises determining whether the procedure to be performed by the device setting apparatus to cause the counterpart apparatus to perform a user request is one of one or more procedures that require secure communication or one of one or more procedures that do not require secure communication to generate a second determination result, and when the second determination result indicates that the procedure is one of one or more procedures that do not require secure communication,
sending a communication setting change request to the counterpart apparatus that causes the counterpart apparatus to change a communication setting from a value that requires the secure communication interface protocol to a value that requires the insecure communication interface protocol; and
sending the request for performing the user request to the counterpart apparatus using the insecure communication interface protocol.

10. The method of claim 9, wherein the operation of setting secure communication includes at least one of:
sending a certificate install request, using an insecure communication interface protocol, that causes the counterpart apparatus to create and install a certificate required for the counterpart apparatus to communicate with the device setting apparatus using the secure communication interface protocol; and
sending a secure communication setting request, using the insecure communication interface protocol, that causes the counterpart apparatus to set a communication setting to have a value that requires the secure communication interface protocol.

11. The method of claim 10, wherein the operation of setting secure communication further includes:
causing the counterpart apparatus to create a certificate signing request (CSR) that requests a certificate authority to sign the certificate;
transmitting the CSR created by the counterpart apparatus to the certificate authority to have the certificate authority sign the certificate; and
installing the signed certificate onto the counterpart apparatus.

12. The method of claim 10, further comprising:
generating a determination result indicating that an error has occurred when a setting operation is not successfully performed, the setting operation including the operation of setting secure communication and the operation of performing the user request;
specifying a state of the counterpart apparatus when a request that causes the error is received by the counterpart apparatus from the device setting apparatus as an error state of the counterpart apparatus; and
executing a browser based on information regarding the error state of the counterpart apparatus so as to cause the device setting apparatus to display a screen corresponding to the error state of the counterpart apparatus.

13. A device setting system including a device setting apparatus and a counterpart apparatus connected through a network, the system comprising:
  a processor;
  a storage device configured to store a plurality of instructions which cause the device setting apparatus to:
    send a secure communication request to the counterpart apparatus to start secure communication via a secure interface protocol;
    determine whether the counterpart apparatus is capable of performing secure communication based on whether a response is received by the device setting apparatus in response to the secure communication request and contents of the response when the response is received in response to the secure communication request to generate a first determination result;
    execute operation of setting secure communication for the counterpart apparatus according to the first determination result indicating that the counterpart apparatus is not capable of performing secure communication; and
    send a request for performing a user request to the counterpart apparatus using a secure communication interface protocol or an insecure communication interface protocol, wherein
  the storage device further stores instructions which, after the operation of setting the secure communication for the counterpart apparatus is executed, cause the device setting apparatus to determine whether a procedure to be performed by the device setting apparatus to cause the counterpart apparatus to perform a user request is one of one or more procedures that require secure communication or one of one or more procedures that do not require secure communication to generate a second determination result, and when the second determination result indicates that the procedure is one of one or more procedures that do not require secure communication,
    send a communication setting change request to the counterpart apparatus that causes the counterpart apparatus to change a communication setting from a value that requires the secure communication interface protocol to a value that requires the insecure communication interface protocol; and
    send the request for performing the user request to the counterpart apparatus using the insecure communication interface protocol.

14. The system of claim 13, wherein the plurality of instructions further cause the device setting apparatus to:
  generate a determination result indicating that an error has occurred when a setting operation is not successfully performed, the setting operation including the operation of setting secure communication and the operation of performing the user request;
  specify a state of the counterpart apparatus when a request that causes the error is received by the counterpart apparatus from the device setting apparatus as an error state of the counterpart apparatus; and
  execute a browser based on information regarding the error state of the counterpart apparatus so as to cause the device setting apparatus to display a screen corresponding to the error state of the counterpart apparatus.

15. The device setting apparatus of claim 1, wherein the process manager device is configured to determine whether installation of a certificate is required based on the first determination result.

16. The method of claim 9, further comprising determining whether installation of a certificate is required based on the first determination result.

17. The system of claim 13, wherein the plurality of instructions further cause the device setting apparatus to determine whether installation of a certificate is required based on the first determination result.

* * * * *